United States Patent
Austrheim

(10) Patent No.: US 12,319,501 B2
(45) Date of Patent: *Jun. 3, 2025

(54) CONTAINER HANDLING VEHICLE WITH FIRST AND SECOND SECTIONS AND LIFTING DEVICE MOTOR IN SECOND SECTION

(71) Applicant: Autostore Technology AS, Nedre Vats (NO)

(72) Inventor: Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,330

(22) Filed: Dec. 28, 2023

(65) Prior Publication Data
US 2024/0132283 A1    Apr. 25, 2024
US 2024/0228162 A9    Jul. 11, 2024

Related U.S. Application Data

(63) Continuation of application No. 17/805,169, filed on Jun. 2, 2022, now Pat. No. 11,891,246, which is a
(Continued)

(30) Foreign Application Priority Data

Apr. 25, 2018 (NO) .................................... 2018/0591
Apr. 25, 2018 (NO) .................................... 20180589
(Continued)

(51) Int. Cl.
*B65G 1/04*    (2006.01)
*B65G 1/06*    (2006.01)
*B65G 1/137*   (2006.01)

(52) U.S. Cl.
CPC ........... *B65G 1/0464* (2013.01); *B65G 1/065* (2013.01); *B65G 1/137* (2013.01); *B65G 2201/0235* (2013.01)

(58) Field of Classification Search
CPC .... B65G 2201/02; B65G 1/137; B65G 1/065; B65G 1/0478; B65G 1/0464
See application file for complete search history.

(56) References Cited

U.S. PATENT DOCUMENTS

| | | |
|---|---|---|
| 3,051,321 A | 8/1962 | Ramsden |
| 11,377,298 B2 | 7/2022 | Austrheim |

(Continued)

FOREIGN PATENT DOCUMENTS

| | | |
|---|---|---|
| CN | 2031388 U | 1/1989 |
| CN | 1727177 A | 2/2006 |

(Continued)

OTHER PUBLICATIONS

Mitsuyoshi Kato, Notice of Reasons for Rejection in Japanese Patent Application No. 2023-071463, mailed Jun. 20, 2024, 21 pages (including translation), Japan Patent Office, Toyko, Japan.
(Continued)

*Primary Examiner* — Kaitlin S Joerger
(74) *Attorney, Agent, or Firm* — Baker Botts L.L.P.

(57) ABSTRACT

A container handling vehicle for picking up storage containers from a three-dimensional grid of an underlying storage system includes a first set of wheels for moving the vehicle along an X direction on a rail system of the grid; and a second set of wheels for moving the vehicle along a Y direction on the rail system of the grid. The Y direction is perpendicular to the X direction. The container handling vehicle includes a vehicle body having a vehicle body footprint defined by horizontal peripheries in the X and Y directions of the vehicle body. The vehicle body includes a
(Continued)

first section and a second section. The first section has a first footprint and the second section has a second footprint. The first and second footprints are defined by horizontal peripheries in the X and Y directions of the first and second sections, respectively. The container handling vehicle includes a lifting device for lifting storage containers from the storage system; and a lifting device motor arranged to drive the lifting device when lifting storage containers from the storage system. The first section and the second section are arranged side-by-side such that a total area of the first and second footprints equals a total area of the vehicle body footprint, and a centre point of the first footprint is arranged off centre relative a centre point of the vehicle body footprint. The first section defines a storage container receiving space which is configured to accommodate a storage container. The first section accommodates the lifting device for lifting a storage container from the storage system. The lifting device motor is accommodated in the second section.

12 Claims, 15 Drawing Sheets

Related U.S. Application Data continuation of application No. 17/048,942, filed as application No. PCT/EP2019/053672 on Feb. 14, 2019, now Pat. No. 11,377,298.

(30) Foreign Application Priority Data

| Apr. 25, 2018 | (NO) | ................................... 20180590 |
| Oct. 11, 2018 | (WO) | ................. PCT/EP2018/077687 |
| Oct. 11, 2018 | (WO) | ................. PCT/EP2018/077713 |
| Oct. 11, 2018 | (WO) | ................. PCT/EP2018/077732 |

(56) References Cited

U.S. PATENT DOCUMENTS

| 2004/0101393 A1 | 5/2004 | Lopez Alba |
| 2015/0127143 A1 | 5/2015 | Lindbo et al. |
| 2015/0307276 A1 | 10/2015 | Hognaland |
| 2016/0325932 A1 | 11/2016 | Hognaland |
| 2016/0340122 A1 | 11/2016 | Lindblom |
| 2017/0129702 A1 | 5/2017 | Hognaland |
| 2017/0152111 A1 | 6/2017 | Kinugawa et al. |
| 2017/0176082 A1 | 6/2017 | Hognaland |
| 2018/0029798 A1 | 2/2018 | Lindbo et al. |
| 2018/0072546 A1 | 3/2018 | Hognaland |
| 2018/0319590 A1 | 11/2018 | Lindbo et al. |
| 2020/0307911 A1 | 10/2020 | Austrheim et al. |

FOREIGN PATENT DOCUMENTS

| CN | 2813532 Y | 9/2006 |
| CN | 201186760 Y | 1/2009 |
| CN | 201439447 U | 4/2010 |
| CN | 101618796 B | 6/2011 |
| CN | 103612882 A | 3/2014 |
| CN | 103818672 A | 5/2014 |
| CN | 104210794 A | 12/2014 |
| CN | 104495209 A | 4/2015 |
| CN | 205366815 U | 7/2016 |
| CN | 206679768 U | 11/2017 |
| CN | 206798444 U | 12/2017 |
| JP | S64-24090 U | 2/1989 |
| JP | H02-11455 A | 1/1990 |
| JP | H08-38268 A | 2/1996 |
| JP | 2009161333 A | 7/2009 |
| JP | 2016183050 A | 10/2016 |
| KR | 20060064298 A | 6/2006 |
| NO | 317366 B1 | 10/2004 |
| WO | 2014090684 A1 | 6/2014 |
| WO | 2015/019055 A1 | 2/2015 |
| WO | 2015/115965 A1 | 8/2015 |
| WO | 2015193278 A1 | 12/2015 |
| WO | 2016/120075 A1 | 8/2016 |
| WO | 2017/081281 A1 | 5/2017 |
| WO | 17081275 A1 | 5/2017 |
| WO | 2017129384 A1 | 8/2017 |
| WO | 2017153583 A1 | 9/2017 |
| WO | 2017-220627 A1 | 12/2017 |
| WO | 2018/060527 A1 | 4/2018 |
| WO | 2019/101725 A1 | 5/2019 |
| WO | 2019206487 A1 | 10/2019 |
| WO | 2020169287 A1 | 8/2020 |
| WO | 2021197867 A1 | 10/2021 |
| WO | 2021209338 A2 | 10/2021 |

OTHER PUBLICATIONS

International Search Report issued in Application No. PCT/EP2018/077687, mailed on Jan. 21, 2019 (16 pages).
Written Opinion issued in International Application No. PCT/EP2018/077687, mailed on Jan. 19, 2020 (13 pages).
International Preliminary Report on Patentability issued in Application No. PCT/EP2018/077687, mailed on Aug. 3, 2020 (19 pages).
Search Report issued in Norwegian Application No. 20180589, mailed on Nov. 23, 2018 (2 pages).
International Search Report issued in PCT/EP2018/077732 mailed on Jan. 17, 2019 (5 pages).
Written Opinion of the International Searching Authority issued in PCT/EP2018/077732 mailed on Jan. 17, 2019 (11 pages).
Norwegian Search Report issued in No. 20180591 mailed on Nov. 23, 2018 (2 pages).
International Search Report issued in PCT/EP2018/077713 mailed on Jan. 15, 2019 (7 pages).
Written Opinion of the International Searching Authority issued in PCT/EP2018/077713 mailed on Jan. 15, 2019 (11 pages).
Wikipedia; "Brushless DC electric motor"; Internet URL: https://en.wikipedia.org/wiki/Brushless_DC_electric_motor ; Oct. 13, 2020 (9 pages).
Ahn, Jin-Woo; "Switched Reluctance Motor"; Torque Control; Internet URL: http://cdn.intechweb.org/pdfs/13717.pdf; retrieved Oct. 13, 2020, pp. 201-252 (54 pages).
International Search Report issued in PCT/EP2019/053672 mailed on May 13, 2019 (5 pages).
Written Opinion of the International Searching Authority issued in PCT/EP2019/053672 mailed on May 13, 2019 (11 pages).
International Search Report issued in PCT/EP2019/053681 mailed on May 21, 2019 (6 pages).
Written Opinion of the International Searching Authority issued in PCT/EP2019/053681 mailed on May 21, 2019 (8 pages).
Office Action issued in counterpart Chinese Application No. 2019800279947 mailed Jul. 6, 2021 (11 pages).
Office Action issued in Chinese Patent Application No. 202210332645X, mailed on Apr. 24, 2024 (12 pages).
Lui Jing, Second Office Action for Chinese Patent Application No. 202210332645.X, dated Aug. 22, 2024, 12 pages, pub. by SIPO, Beijing, China.
Hoffert, Rudi, Extended European Search Report for European patent application No. EP24169303.5, dated Dec. 3, 2024, 10 pages, published by the European Patent Office, Munich, Germany.

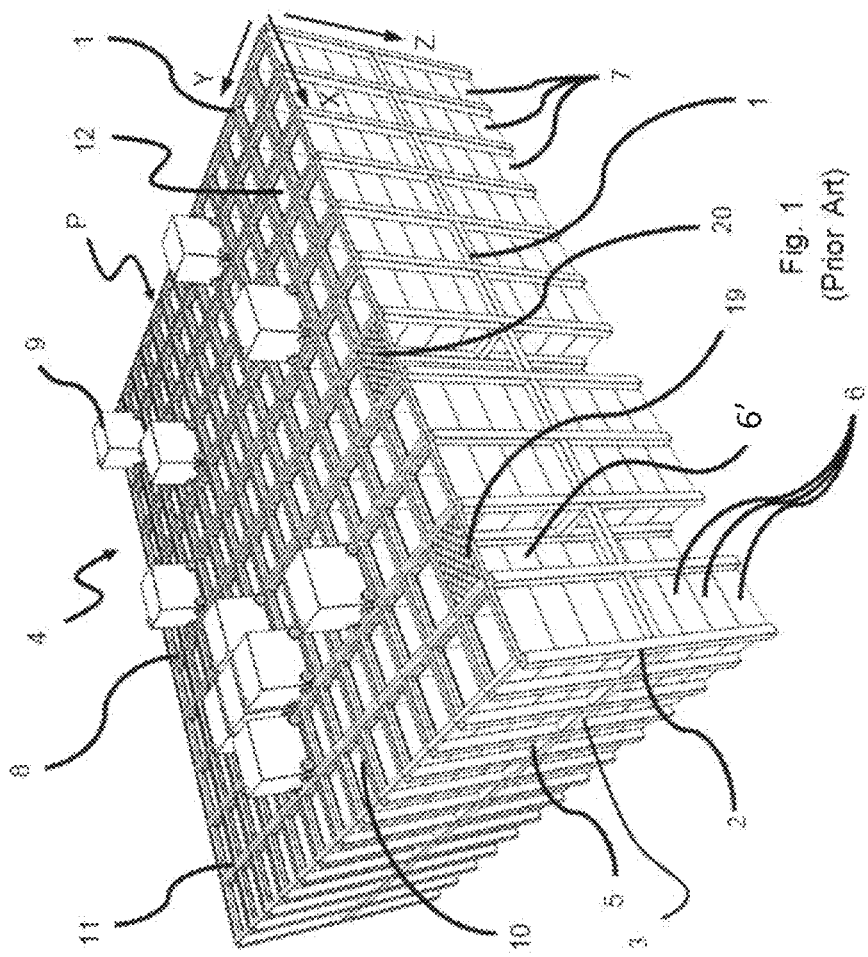

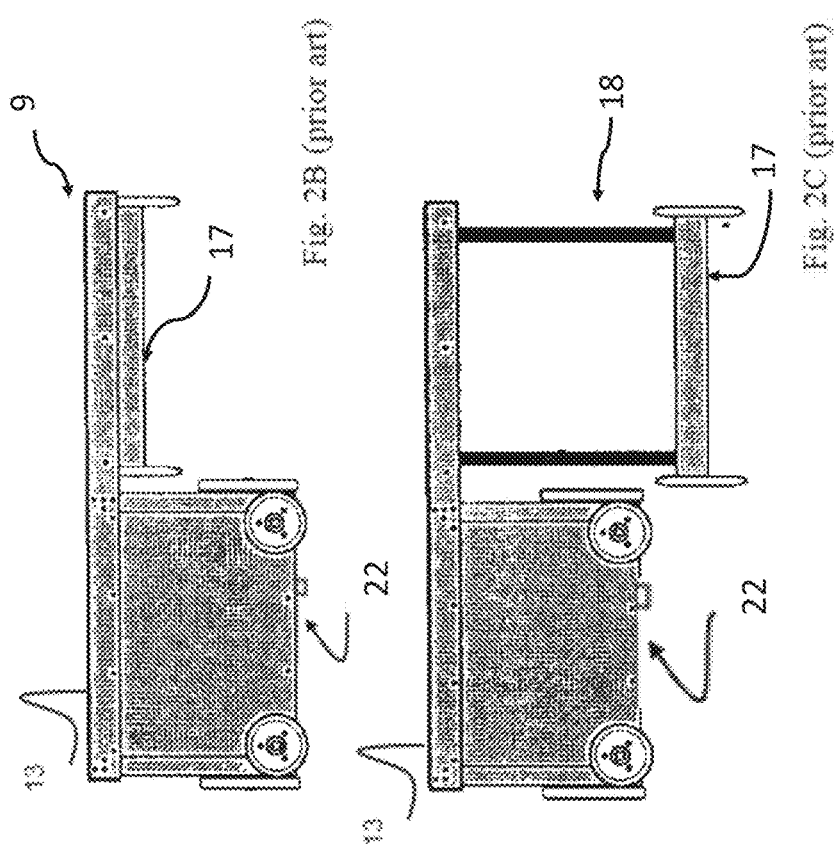
Fig. 2B (prior art)
Fig. 2C (prior art)
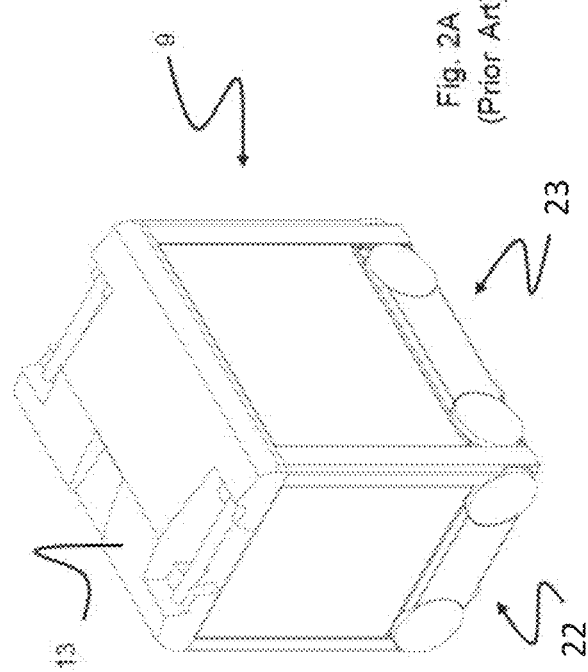
Fig. 2A (Prior Art)

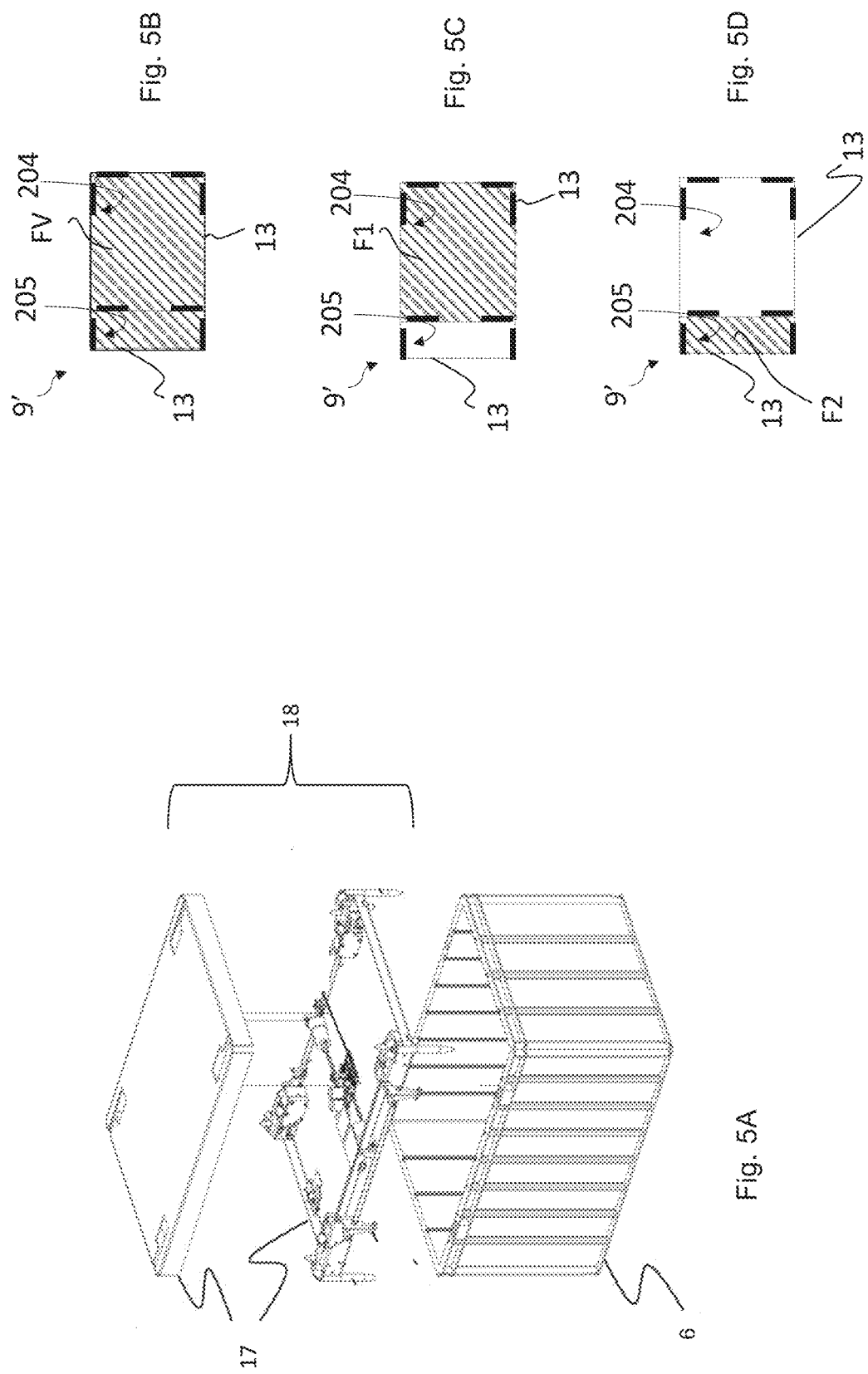

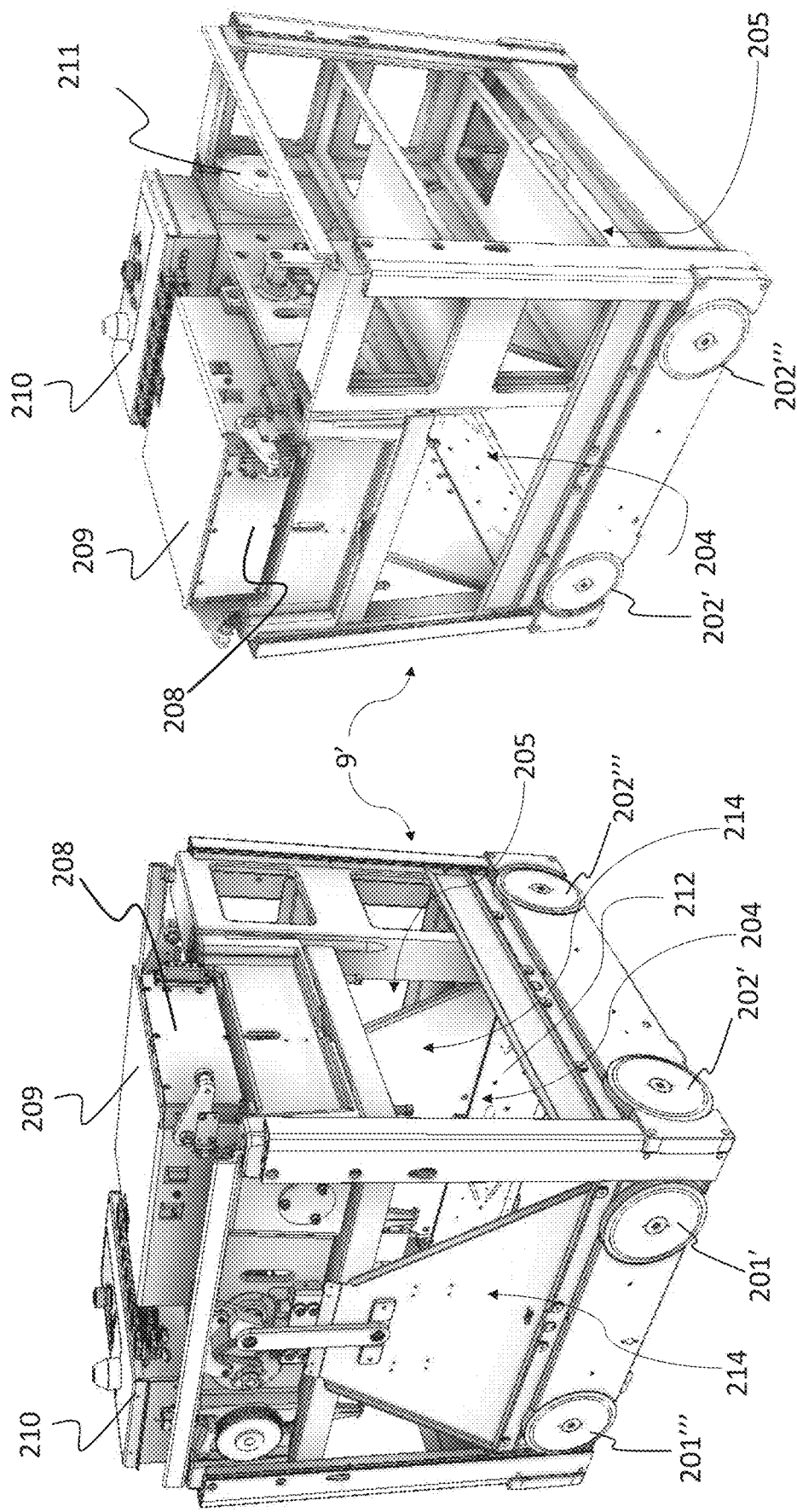

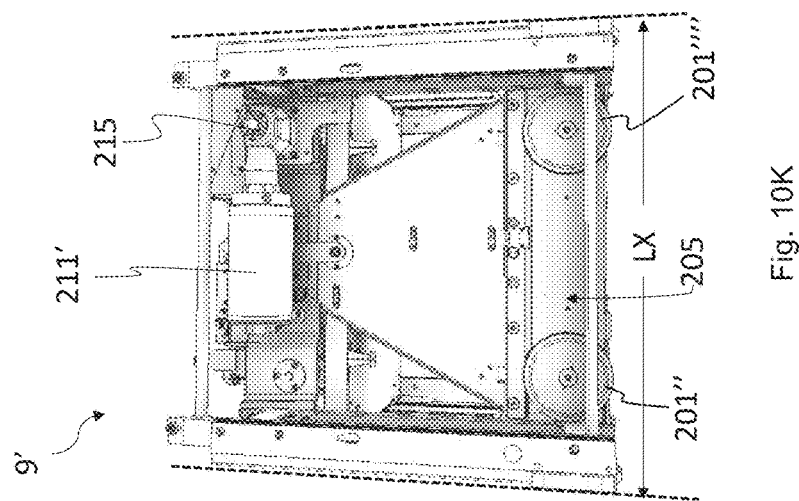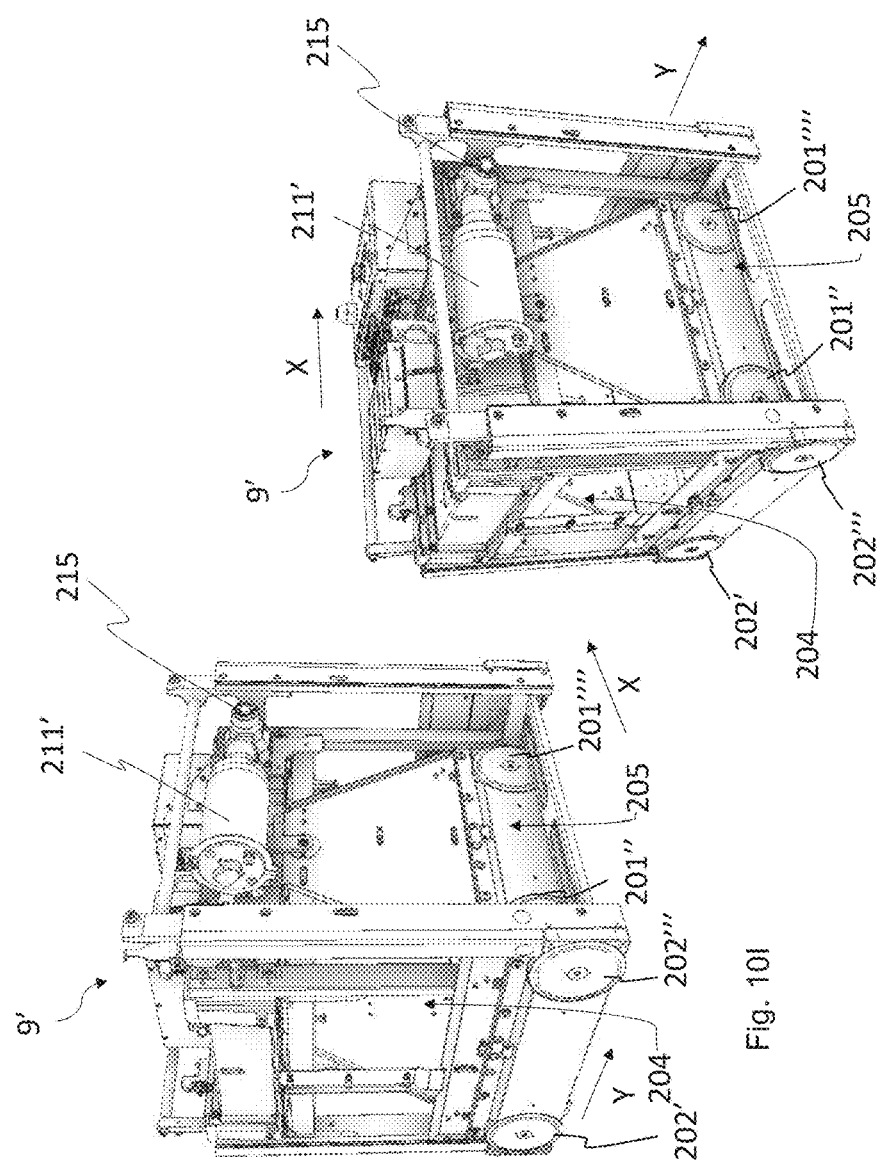

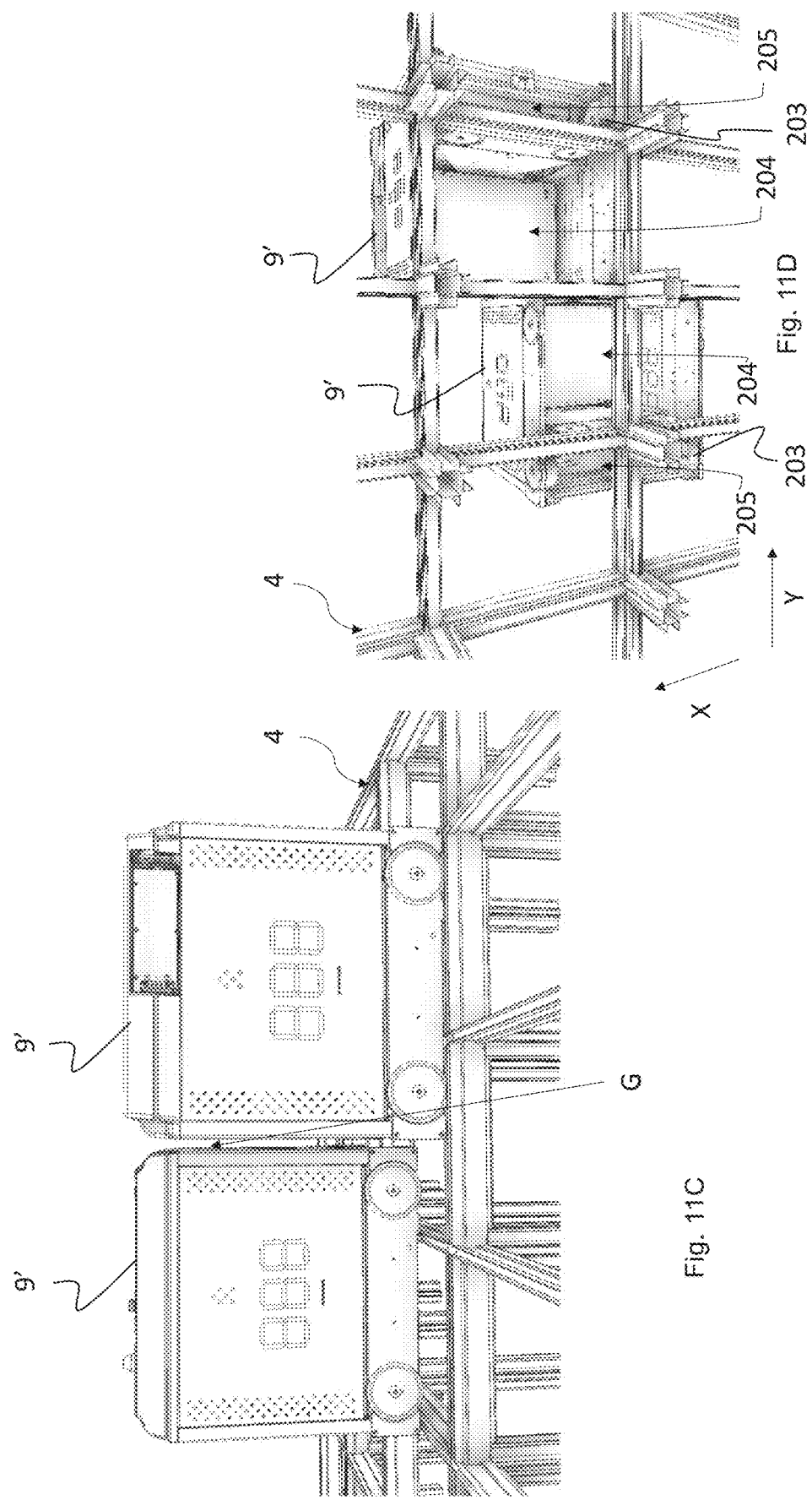

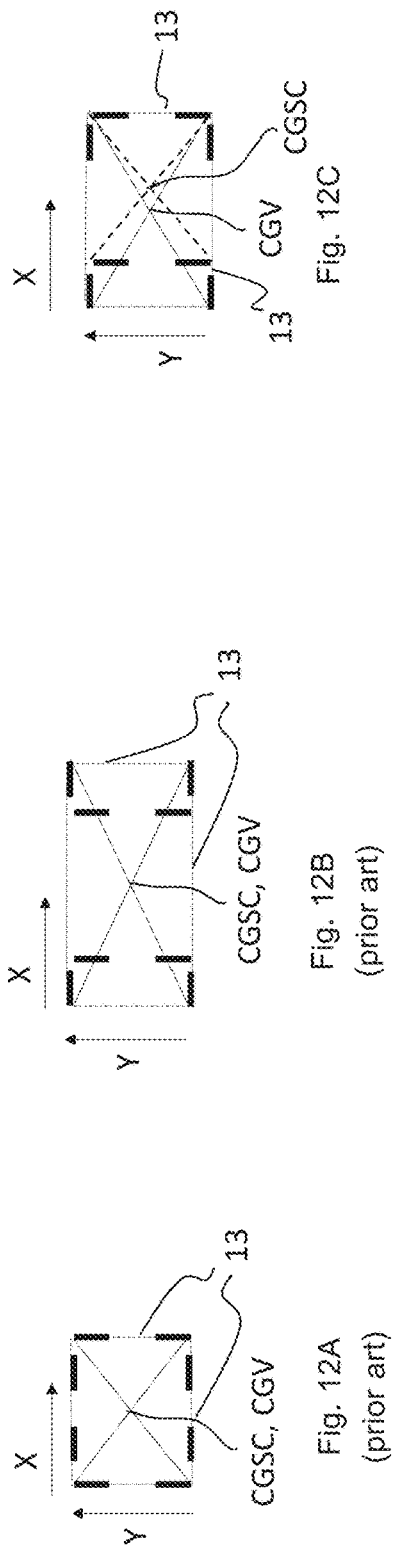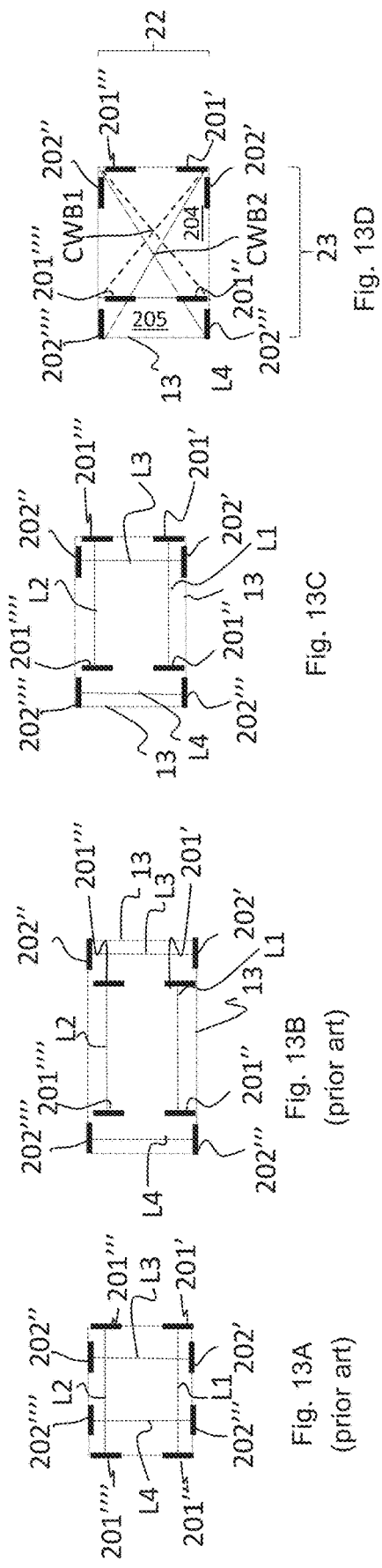

CONTAINER HANDLING VEHICLE WITH FIRST AND SECOND SECTIONS AND LIFTING DEVICE MOTOR IN SECOND SECTION

The present invention relates to the field container handling vehicles for automated storage and retrieval systems and to automated storage and retrieval systems comprising such container handling vehicles.

BACKGROUND

The Applicant's already known AutoStore system is a storage system comprising a three-dimensional storage grid structure wherein storage containers/containers are stacked on top of each other to a certain height. Such a prior art system is shown in FIG. 1. The storage system is disclosed in detail in for instance NO317366 and WO 2014/090684 A1.

FIG. 1 discloses a framework structure of a typical prior art automated storage and retrieval system 1 and FIGS. 2a and 2b disclose known container handling vehicles of such a system.

The framework structure comprises a plurality of upright members/profiles 2 and a plurality of horizontal members 3, which are supported by the upright members 2. The members 2, 3 may typically be made of metal, e.g. extruded aluminium profiles.

The framework structure defines a storage grid 4 comprising multiple grid opening/columns 12 arranged in rows. A majority of the grid columns 12 are storage columns 5 in which storage containers 6, also known as containers or bins, are stacked one on top of another to form stacks 7. Each storage container 6 (or container for short) may typically hold a plurality of product items (not shown), and the product items within a storage container 6 may be identical, or may be of different product types depending on the application. The framework structure guards against horizontal movement of the stacks 7 of storage containers 6, and guides vertical movement of the containers 6, but does normally not otherwise support the storage containers 6 when stacked.

The upper horizontal members 3 comprise a rail system 8 arranged in a grid pattern across the top of the grid columns 12, on which rail system 8 a plurality of container handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container handling vehicles 9 in a first direction X across the top of the frame structure, and a second set of parallel rails 11 arranged perpendicular to the first set of rails 10 to guide movement of the container handling vehicles 9 in a second direction Y, which is perpendicular to the first direction X, see FIG. 3. In this way, the rail system 8 defines an upper end of the storage columns 5, above which the container handling vehicles 9 can move laterally above the storage columns 5, i.e. in a plane, which is parallel to the horizontal X-Y plane.

Each container handling vehicle 9 comprises a vehicle body 13 and first and second sets of wheels 22, 23 which enable the lateral movement of the container handling vehicle 9, i.e. the movement in the X and Y directions. In FIG. 2, two wheels in each set are visible. The first set of wheels 22 is arranged to engage with two adjacent rails of the first set 10 of rails, and the second set of wheels 23 arranged to engage with two adjacent rails of the second set 11 of rails. One of the set of wheels 22, 23 can be lifted and lowered, so that the first set of wheels 22 and/or the second set of wheels 23 can be engaged with their respective set of rails 10, 11 at any one time.

Each container handling vehicle 9 also comprises a lifting device 18 (not shown in FIGS. 1 and 2a, but visible in FIG. 2b) for vertical transportation of storage containers 6, e.g. raising a storage container 6 from and lowering a storage container 6 into a storage column 5. The lifting device 18 comprises a lifting frame (not shown in FIG. 2a, but similar to the one shown in FIG. 2b labelled 17) which is adapted to engage a storage container 6, which lifting frame can be lowered from the vehicle body 13 so that the position of the lifting frame with respect to the vehicle body 13 can be adjusted in a third direction Z, which is orthogonal the first direction X and the second direction Y.

Conventionally, and for the purpose of this application, $Z=1$ identifies the uppermost layer of the grid 4, i.e. the layer immediately below the rail system 8 (in the present application, the rail system 8 is termed the top level of the grid), $Z=2$ is the second layer below the rail system 8, $Z=3$ is the third layer etc. In the embodiment disclosed in FIG. 1, $Z=8$ identifies the lowermost, bottom layer of the grid 4. Consequently, as an example and using the Cartesian coordinate system X, Y, Z indicated in FIG. 1, the storage container identified as 6' in FIG. 1 can be said to occupy grid location or cell $X=10$, $Y=2$, $Z=3$. The container handling vehicles 9 can be said to travel in layer $Z=0$ and each grid column 12 can be identified by its X and Y coordinates.

Each container handling vehicle 9 comprises a storage compartment or space for receiving and stowing a storage container 6 when transporting the storage container 6 across the grid 4. The storage space may comprise a cavity 21 arranged centrally within the vehicle body 13, e.g. as is described in WO2014/090684A1, the contents of which are incorporated herein by reference.

Alternatively, the container handling vehicles may have a cantilever construction, as is described in NO317366, the contents of which are also incorporated herein by reference.

The single cell container handling vehicles 9 may have a footprint F, i.e. a horizontal periphery in the X and Y directions (see FIG. 4), which is generally equal to the lateral or horizontal extent of a grid column 12, i.e. the periphery/circumference of a grid column 12 in the X and Y directions, e.g. as described in WO2015/193278A1, the contents of which are incorporated herein by reference. Alternatively, the container handling vehicles 9 may have a footprint which is larger than the lateral extent of a grid column 12, e.g. as disclosed in WO2014/090684A1.

The rail system 8 may be a single-track system, as shown in FIG. 3. Preferably, the rail system 8 is a double-track system, as shown in FIG. 4, thus allowing a container handling vehicle 9 having a footprint F generally corresponding to a lateral extent of a grid column 12 to travel along a row of grid columns in either an X or Y direction even if another container handling vehicle 9 is positioned above a grid column 12 adjacent to that row.

In a storage grid, a majority of the grid columns 12 are storage columns 5, i.e. grid columns where storage containers are stored in stacks. However, a grid normally has at least one grid column 12 which is used not for storing storage containers, but which comprises a location where the container handling vehicles can drop off and/or pick up storage containers so that they can be transported to an access station where the storage containers 6 can be accessed from outside of the grid or transferred out of or into the grid, i.e. a container handling station. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container handling vehicles 9 can drop off storage containers to be transported to an access or a transfer station (not shown), and the second port 20 column may be a dedicated pick-up port column where the container handling vehicles 9 can pick up storage containers that have been transported to the grid 4 from an access or a transfer station.

When a storage container 6 stored in the grid 4 disclosed in FIG. 1 is to be accessed, one of the container handling vehicles 9 is instructed to retrieve the target storage container from its position in the grid 4 and transport it to the drop-off port 19. This operation involves moving the container handling vehicle 9 to a grid location above the storage column 5 in which the target storage container is positioned, retrieving the storage container 6 from the storage column 5 using the container handling vehicle's lifting device (not shown, being internally arranged in a central cavity of the vehicle, but similar to the lifting device 18 of the second prior art vehicle of FIG. 2b), and transporting the storage container to the drop-off port 19. A second prior art vehicle 9 is shown in FIG. 2b to better illustrate the general design of the lifting device. Details of the second vehicle 9 are described in the Norwegian patent NO317366. The lifting devices 18 of both prior art vehicles 9 comprise a set of lifting bands connected close to the corners of a lifting frame 17 (may also be termed a gripping device) for releasable connection to a storage container. To raise or lower the lifting frame 17 (and optionally a connected storage container 6), the lifting bands are spooled on/off at least one rotating lifting shaft or drum (not shown) arranged in the container handling vehicle. Various designs of the at least one lifting shaft are described in for instance WO2015/193278 A1 and PCT/EP2017/050195. The lifting frame 17 features container connecting elements for releasably connecting to a storage container, and guiding pins. If the target storage container is located deep within a stack 7, i.e. with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container handling vehicle that is subsequently used for transporting the target storage container to the drop-off port 19, or with one or a plurality of other cooperating container handling vehicles. Alternatively, or in addition, the automated storage and retrieval system may have container handling vehicles specifically dedicated to the task of temporarily removing storage containers from a storage column. Once the target storage container has been removed from the storage column, the temporarily removed storage containers can be repositioned into the original storage column. However, the removed storage containers may alternatively be relocated to other storage columns.

When a storage container 6 is to be stored in the grid 4, one of the container handling vehicles 9 is instructed to pick up the storage container from the pick-up port 20 and transport it to a grid location above the storage column 5 where it is to be stored. After any storage containers positioned at or above the target position within the storage column stack have been removed, the container handling vehicle 9 positions the storage container at the desired position. The removed storage containers may then be lowered back into the storage column, or relocated to other storage columns.

For monitoring and controlling the automated storage and retrieval system, e.g. monitoring and controlling the location of respective storage containers within the grid 4, the content of each storage container 6 and the movement of the container handling vehicles 9 so that a desired storage container can be delivered to the desired location at the desired time without the container handling vehicles 9 colliding with each other, the automated storage and retrieval system comprises a control system, which typically is computerised and comprises a database for keeping track of the storage containers.

The prior art solutions include both so-called cantilever robots and single cell robots. The cantilever robots may have available space for larger motors, however the robots may be more unstable than their single cell counterparts. Thus, larger motors with increased acceleration could result in the robots tilting excessively. Some embodiments of the single cell robots have wheel hub motors of an in-wheel-motor configuration. The in-wheel configuration allows the wheel hub motor to fit inside the wheel and vehicle body so as not to occupy space within the cavity for receiving storage containers. Thus, the prior art single cell robots do not have any available space for larger hub motors without impinging on the storage container space inside the robot.

Consequently, the prior art solutions may have potential drawbacks in relation to stability of the robots and or limited space for larger, more powerful wheel motors, in particular for single cell robots, where motors can be of the so called in-wheel-motor configuration in order to be as small as possible to fit in the wheel and vehicle body while not occupying the cavity for receiving storage containers.

In view of the above, it is desirable to provide a container handling vehicle, an automated storage and retrieval system comprising said container handling vehicle, that solve or at least mitigate one or more of the aforementioned problems related to the robots.

In particular, it is an objective of the present invention to provide a robot with improved acceleration and/or speed.

A further object of the invention is to provide a robot having a lifting device with improved acceleration, lifting capacity and/or speed.

SUMMARY OF THE INVENTION

The present invention is defined in the attached claims and in the following.

It is described a container handling vehicle for picking up storage containers from a three-dimensional grid of an underlying storage system, comprising
- a first set of wheels for moving the vehicle along an X direction on a rail system of the grid; and
- a second set of wheels for moving the vehicle along a Y direction on the rail system of the grid, the Y direction being perpendicular to the X direction;
- a vehicle body, the vehicle body having a vehicle body footprint defined by horizontal peripheries in the X and Y directions of the vehicle body, the vehicle body comprising a first section and a second section, the first section having a first footprint and the second section having a second footprint, the first and second footprints being defined by horizontal peripheries in the X and Y directions of the first and second sections, respectively;

a lifting device for lifting storage containers from the storage system; and
a lifting device motor arranged to drive the lifting device when lifting storage containers from the storage system; wherein
the first section and the second section are arranged side-by-side such that a total area of the first and second footprints equals a total area of the vehicle body footprint, and a centre point of the first footprint is arranged off centre relative a centre point of the vehicle body footprint;
the first section defines a storage container receiving space which is configured to accommodate a storage container, the first section also accommodating the lifting device for lifting a storage container from the storage system; and
the lifting device motor is accommodated in the second section.

A size ratio of the first footprint relative the second footprint may be at least 2:1. Preferably, the size ratio of the first footprint relative the second footprint may be 3:1, even more preferably the size ratio of the first footprint relative the second footprint may be 4:1, even more preferably the size ratio of the first footprint relative the second footprint may be 5:1, even more preferably the size ratio of the first footprint relative the second footprint may be 6:1, even more preferably the size ratio of the first footprint relative the second footprint may be 7:1. In general, smaller extent of the second section in the Y direction, i.e. the narrower the section is and generally the more stable container handling vehicle will be when travelling in X direction. The X direction is the direction where the wheels in the second section are not in contact with the underlying rail system, and so the second section overhangs the wheelbase of the set of wheels (the first set of wheels) that are in contact with the rails at that point.

The lifting device may comprise a lifting shaft which comprise a first end section and a second end section for connecting a first pair of lifting bands and a second pair of lifting bands. All lifting bands may be connected to a lifting frame of the lifting device for lifting and lowering of the lifting device. The lifting bands may have a first end and a second end connected to the lifting shaft and a corresponding lifting band connector on the lifting frame, respectively. Each pair of lifting b ands may have a first lifting band connected at the first end section of the lifting shaft and a second lifting band connected at the second end section of the lifting shaft. The first pair of lifting bands may extend in a substantially horizontal direction from the lifting shaft towards a band guiding assembly, the band guiding assembly may be arranged to change the direction of the first pair of lifting bands to extend in a vertical direction, and the second pair of lifting bands may extend in a vertical direction from the lifting shaft. Such setup, i.e. only one lifting shaft where all lifting bands are spooled onto, eliminates the need of a separate belt for synchronizing two independent lifting shafts.

The first set of wheels may be arranged on opposite sides of the first section and the second set of wheels may be arranged on opposite sides of the vehicle body.

The first set of wheels comprises four wheels in total. The four wheels in the first set of wheels are arranged as two pairs of wheel for movement in the X direction, where the wheels of each pair are arranged on opposite sides of the first section.

The second set of wheels comprises four wheels in total. The four wheels are arranged as two pairs of wheels for movement in the Y direction, where the wheels of each pair are arranged on opposite sides of the vehicle body (which may also be on opposite sides of the first section).

The container handling vehicle may further comprise a lifting axle and the lifting device motor may be connected at one end of the lifting axle.

The container handling vehicle may further comprise an angled transmission arranged in the second section between the lifting axle and the lifting device motor.

The lifting device motor may be arranged perpendicular to the lifting device axle via the angled transmission.

An extension of a lifting device axle may extend into the second section and a hollow shaft gear may be connected directly to the extension of the lifting device axle.

The hollow shaft gear and the lifting device motor may be angled sideways.

If the lifting device motor is angled sideways, i.e. with a longitudinal axis of the lifting device motor in a horizontal or mainly horizontal direction, this has particular advantages in that as the motor may weigh up to 10 kilograms and above and may be arranged at a relatively high elevation compared to a total height of container handling vehicle, orienting the lifting device motor and angled transmission sideways provides for a more stable container handling vehicle in that the weight is more optimally distributed towards the midline of the container handling vehicle. In addition, as the control system and power source for the lifting device motor is arranged mainly in the center of an upper part of the container handling vehicle, this orientation of the lifting device motor requires shorter power cable(s) and encoder cable(s) to the control system which is advantageous as the performance is increased and the noise is significantly reduced.

The lifting device motor may be angled downwards, i.e. with a longitudinal axis of the lifting device motor in a vertical or mainly vertical direction. Such a setup renders possible the use of two lifting device motors connected to respective lifting axles. If two lifting device motors are arranged at opposite sides in the second section this can provide a more stable container handling vehicle as the weight distribution from the lifting device motors will be more advantageous in terms of the overall centre of gravity for the container handling vehicle.

It is also described a container handling vehicle for picking up storage containers from a three-dimensional grid of an underlying storage system, comprising
a first set of wheels arranged at opposite portions of a vehicle body of the container handling vehicle, for moving the vehicle along a first direction on a rail system of the grid; and
a second set of wheels arranged at opposite portions of the vehicle body, for moving the vehicle along a second direction on the rail system of the grid, the second direction being perpendicular to the first direction;
wherein
the vehicle body comprises walls (the walls being substantially vertical) on all sides forming a footprint defined by horizontal peripheries in the X and Y directions of the vehicle body, and the container handling vehicle further comprises:
a first section and a second section arranged side-by-side such that a centre point of a footprint of the first section is arranged off centre relative a centre point of the footprint FV of the vehicle body, and
wherein a size ratio of the footprint F1 of the first section relative a footprint F2 of the second section is at least 2:1, and wherein the first section is configured to accommodate a storage container, the second section comprises an assembly of motors for driving at least one wheel of each of the sets of wheels.

The container handling vehicle may also be defined as a container handling vehicle for picking up storage containers from a three-dimensional grid of an underlying storage system, comprising a first set of wheels arranged at opposite portions of a vehicle body of the container handling vehicle, for moving the vehicle along a first direction on a rail system of the grid; and a second set of wheels arranged at opposite portions of the vehicle body, for moving the vehicle along a second direction on the rail system of the grid, the second direction being perpendicular to the first direction;

wherein the vehicle body comprises walls (the walls being substantially vertical) on all sides forming a footprint defined by horizontal peripheries in the X and Y directions of the vehicle body, and the container handling vehicle further comprises:

a first section and a second section arranged side-by-side such that a centre point of a footprint of the first section is arranged off centre relative a centre point of the footprint FV of the vehicle body, and wherein a size ratio of the footprint F1 of the first section relative a footprint F2 of the second section is at least 2:1, and wherein the first section is configured to accommodate a storage container, the second section comprises any of multiple hub motors for driving two wheels of each of the set of wheels, a motor for driving a lifting device and/or rechargeable batteries.

The first section may comprise a cavity for accommodating a storage container, and a lifting device arranged at a top section/upper level of the cavity.

The first set of wheels may be displaceable in a vertical direction between a first position, where the first set of wheels allow movement of the vehicle along the first direction, and a second position, where the second set of wheels allow movement of the vehicle along the second direction.

The assembly of motors may comprise at least one first motor for driving the first set of wheels and at least one second motor for driving the second set of wheels.

The first section may accommodate a first, second, third and fourth wheel of the first set of wheels and a first and second wheel of the second set of wheels, and the second section may accommodate a third and fourth wheel of the second set of wheels.

The first section may accommodate a first and third wheel of the first set of wheels and a first and second wheel of the second set of wheels, and the second section may accommodate a second and a fourth wheel of the first set of wheels and a third and a fourth wheel of the second set of wheels.

The first section may comprise four corners, and rims of the first, second, third and fourth wheels of the first set of wheels and the first and second wheels of the second set of wheels may extend to the corners of the first section.

The at least one first motor may comprise a hub motor for each of the first and fourth wheel of the first set of wheels, and the at least one second motor may comprise a hub motor for each of the third and fourth wheel in the second set of wheels. In other words, each of the first and fourth wheel of the first set of wheels, and each of the third and fourth wheel in the second set of wheels, may be driven by a separate/dedicated hub motor.

The first and second sets of wheels may be arranged at or within a lateral extent of the vehicle body.

The footprint of the first section may correspond to a grid cell of the rail system, and, during use, when the container handling vehicle is in a position to lift or lower a storage container, the second section may be horizontally displaced relative the grid cell and extend partly into a neighbouring grid cell.

The assembly of motors may comprise multiple hub motors and each of the first and fourth wheel of the first set of wheels, and the third and fourth wheel of the second set of wheels, may comprise a separate hub motor. Preferably, the hub motors of the first and fourth wheel of the first set of wheels, and the third and fourth wheel of the second set of wheels, extend into a space in the second section.

The motors of the second set (the third and fourth wheels) may extend from an interior face of the walls of the vehicle body towards a middle region of the second section. The motors of the first set (the first and fourth wheels) may extend from a second section side of a separating element that separates interior spaces of the first and second sections.

It is further described an automated storage and retrieval system comprising a three-dimensional grid and at least one container handling vehicle, the grid comprises a rail system, on which the container handling vehicle may move, and a plurality of stacks of storage containers;

the rail system comprises a first set of parallel tracks arranged in a horizontal plane and extending in a first direction, and a second set of parallel tracks arranged in the horizontal plane and extending in a second direction which is orthogonal to the first direction, wherein the first and second sets of tracks form a grid pattern in the horizontal plane comprising a plurality of adjacent grid cells, each grid cell comprising a grid opening defined by a pair of opposed tracks of the first set of tracks and a pair of opposed tracks of the second set of tracks;

the plurality of stacks of storage containers are arranged in storage columns located beneath the rail system, wherein each storage column is located vertically below a grid opening;

the container handling vehicle features a vehicle body comprising substantially vertical walls on all sides forming a footprint defined by horizontal peripheries in the X and Y directions of the vehicle body, and a first section and a second section arranged side-by-side;

the first section is configured to accommodate a storage container; and the second section comprises at least an assembly of motors for driving at least one wheel of each of the sets of wheels, wherein a footprint of the first section is substantially equal to a grid cell defined by a cross-sectional area, including width of the tracks, between a pair of opposed tracks of the first set of tracks and a pair of opposed tracks of the second set of tracks, and the second section extends partially into a neighbouring grid opening when the first section is positioned over an adjacent grid opening.

An extent of the footprint of the container handling vehicle in the X direction, LX, and Y direction, LY, may be:

LX=1.0 grid cell in the X direction, and

1<LY<1.5 grid cells in the Y direction, wherein a grid cell is defined as the cross-sectional area, including width of the tracks, between the midpoint of two rails running in the X direction and the midpoint of two rails running in the Y direction.

The second section may extend less than 50% into the neighboring grid opening, more preferably less than 40% into the neighboring grid opening, even more preferably less than 30% into the neighboring grid opening, even more preferably less than 20% into the neighboring grid opening.

As indicated above, the container handling vehicle has a first and second section. The footprint of the first section can be equal to the size of an underlying grid cell, and the second section is a protruding section which extends horizontally beyond the footprint of the first section.

A grid cell opening may be defined as the open cross-sectional area between two opposed rails running in the X direction and two opposed rails running in the Y direction.

The footprint of the second section may be less than half the size the footprint of the first section (size ratio less than 1:2 relative the first section). When the container handling vehicle is positioned above a grid cell in a position where it can lift or lower a storage container into or out of the first section, the second section extends into a neighboring grid cell. However, the footprint of the vehicle body is less than 1.5 cells (in the Y-direction) and maximum one grid cell wide in the other direction (X-direction). In other words, the lateral extent of the container handling vehicle in the first direction corresponds to the lateral extent of the tracks in one cell, and maximum 1.5 grid cells in the direction perpendicular to the first direction. Consequently, in an example system for storing and retrieving storage containers, where two of the container handling vehicles described above are operated and are oriented in opposite directions, they occupy three grid cells when travelling in the first direction e.g. in the X-direction, whereas when travelling in the second direction e.g. in the Y-direction, they can travel along neighboring rows of grid cells occupying two grid cells.

The first section of the container handling vehicle may comprise a cavity for accommodating a storage container and a lifting device arranged to transport a storage container vertically between a storage position in a stack and a transport position inside the cavity. The lifting device may comprise a gripping device being configured to releasably grip a storage container; and a lifting motor being configured to raise and lower the gripping device relative to the cavity.

The second section makes it possible to utilize larger and stronger hub motors for driving at least some of the wheels than what is possible in the prior art single cell robots, for example lifting device motors with at least 70% more axial depth and stronger e.g. at least 10% stronger lifting device motors.

Hub motors arranged in the second section (or extending into the second section) may be arranged with a limited distance between them. Due to the smaller distance between the motors, fewer, e.g. one BrushLess Direct Current (BLDC) card, may be required instead of four BLDC cards in the prior art single cell robots. In the prior art solutions, the distance between the motors driving the wheels in the container handling vehicle is of such an extent that typically four BLDC cards are required. The cost of BLDC cards is quite high. However, as the distance between the motors can be substantially reduced by arranging the motors in the second section, the overall cost for the container handling vehicle can be reduced because fewer BLDC cards (e.g. only one BLDC card) is required.

The container handling vehicle may comprise an exchangeable battery. The exchangeable battery can be arranged in an upper portion of the vehicle, above the container storage compartment and lifting device. The exchange sequence of the exchangeable battery may include the following steps:
  the vehicle or overall control system decides that the battery shall be replaced,
  the vehicle is operated to move to a battery exchange station,
  the exchangeable battery is removed from a battery housing,
  the vehicle is operated to move to a battery exchange station having a charged battery using e.g. a capacitor power supply arranged in a controller box in the vehicle,
  the charged battery is installed into the battery housing,
  the vehicle is ready for use.

In the following, numerous specific details are introduced by way of example only to provide a thorough understanding of embodiments of the invention. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In the present disclosure relative terms such as upper, lower, lateral, vertical, X-direction, Y-direction, Z-direction, etc., shall be interpreted using the above mentioned prior art storage system (FIG. 1) as a reference system. Therefore, the feature lateral in relation to the extent in the X-direction and Y-direction of the vehicle shall be understood to be the extent of the vehicle in the X-direction and Y-direction, e.g. the footprint of the vehicle in the X-direction and Y-direction.

BRIEF DESCRIPTION OF THE DRAWINGS

Certain embodiments of the present invention will now be described in detail by way of example only and with reference to the following drawings:

FIG. 1 is a perspective side view of a prior art storage and retrieval system;

FIGS. 2A and 2B depict two different prior art container handling vehicles and

FIG. 2C shows the prior art container handling vehicle of FIG. 2B in a second configuration;

FIG. 5A is an expanded perspective side view of parts of an exemplary lifting device which can be mounted in a container handling vehicle and an associated container which can be lifted by it;

FIGS. 5B, 5C, 5D show the footprints of an exemplary container handling vehicle FV, the first section F1 and the second section F2, where the footprints in each case are shown by the shaded area, respectively;

FIG. 10A is a perspective side view of the container handling vehicle of FIG. 8A with certain details omitted including the covers which have been removed to reveal internal details, for example, an exchangeable battery arranged inside a battery receiving unit in an upper portion of the container handling vehicle;

FIG. 10B is another perspective view of the container handling vehicle of FIG. 10A, where an assembly of motors including a lifting device motor can be seen in the second section;

FIGS. 10I-K are alternative views of a hollow shaft gear used to connect the lifting device motor and the lifting axle where the second section is relatively smaller than the second section in e.g. FIGS. 10F-H;

FIG. 11C is another side view of FIG. 11A, showing a gap between the two container handling vehicles passing each other in the X direction of the rail system;

FIG. 11D shows a perspective view from below of the container handling vehicles;

FIGS. 12A-C show differences in the center of gravity of the storage containers inside the storage container cavity relative the center of the footprint of the vehicle body, where FIG. 12A illustrates a prior art single cell robot, FIG. 12B is a prior art central cavity robot, and FIG. 12C shows a container handling vehicle according to the present invention;

FIGS. 13A-C show differences in imaginary lines extending between each of two pairs of opposed wheels of the same sets of wheels, and which of said lines which intersect or not intersect imaginary lines between other wheels, where FIG. 13A illustrates a prior art single cell robot, FIG. 13B is a prior art central cavity robot, and FIG. 13C shows a container handling vehicle according to the present invention.

FIG. 13D shows a possible setup of centres of wheel bases for the first set of wheels and the second set of wheels, respectively, and that said wheel bases are off-centre relative each other;

In the drawings, like reference numbers have been used to indicate like parts, elements or features unless otherwise explicitly stated or implicitly understood from the context.

DETAILED DESCRIPTION

Figure 4B:
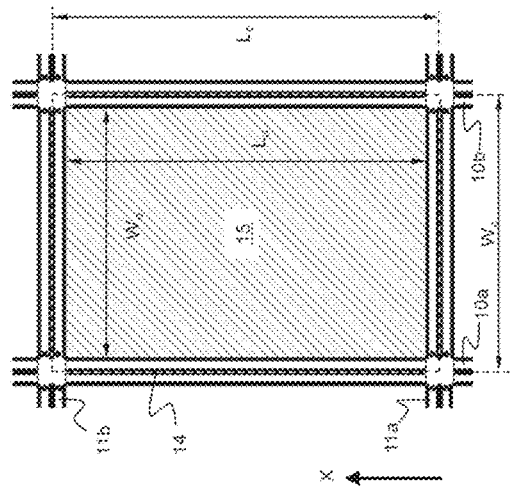
FIGS. 4B and 4C are top views of a rail system similar to FIG. 4A illustrating the extent of a grid cell and the extent of a single cell vehicle operating on it.

In the following, embodiments of the invention will be discussed in more detail by way of example only and with reference to the appended drawings. It should be understood, however, that the drawings are not intended to limit the invention to the subject-matter depicted in the drawings and that features described in one drawing are not necessarily dependent on the presence of other features shown in the same drawing but can be combined with features from embodiments of other drawings.

Figure 4C:
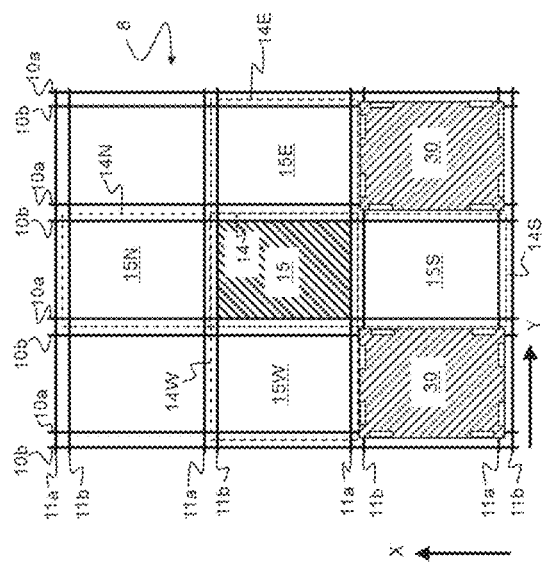
Figure 3:
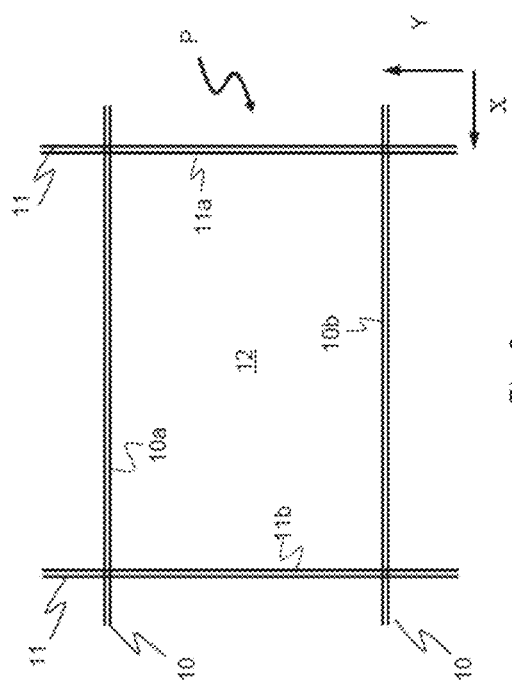
FIGS. 3 and 4A are top schematic views of two types of rail systems for use in the storage system in FIG. 1.
Figure 4A:
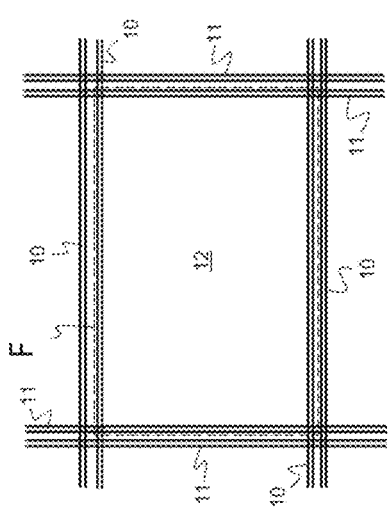

Referring to FIGS. 3 to 4C, top views of two different rail systems of the automated storage and retrieval systems are shown.

The rail system forms a grid structure or grid pattern in the horizontal plane P, see FIG. 1. The grid 4 comprises a plurality of rectangular and uniform grid locations or grid cells 14 (see FIG. 4B), where each grid cell 14 comprises a grid opening 15 (i.e. the upper end of a storage column 12) which is delimited by a pair of opposed rails 10a, 10b of a first set of tracks and a pair of opposed rails 11a, 11b of a second set of tracks. The rails 10a,10b,11a,11b form a rail system 8 on which the container handling vehicle(s) 9' operate. In FIG. 4B, the grid cell 14 is indicated by a dashed box and the grid opening 15 is indicated by a hatched area.

Consequently, pairs of opposed rails 10a and 10b define parallel rows of grid cells running in the X direction, and pairs of opposed rails 11a and 11b extending perpendicular to rails 10a and 10b define parallel rows of grid cells running in the Y direction.

Each grid cell 14 has a width We which is typically within the interval of 30 to 150 cm, and a length $L_c$ which is typically within the interval of 50 to 200 cm. Each grid cell 14 may be rectangular as shown such that $W_c < L_c$. Each grid opening 15 has a width $W_o$ and a length $L_o$ which is typically 2 to 10 cm less than the width $W_c$, and the length $L_c$, respectively, of the grid cell 14. This difference between $W_c$ and $W_o$ and between $L_c$ and $L_o$ corresponds to the width (i.e. the width of a set of tracks) of two opposed rails 10a,10b, 11a,11b or, in effect, the width of a double-track rail since the grid cell extends to the midpoint of such a double-track rail (i.e. a double-track rail comprising 10a and 10b or 11a and 11b).

The double-track rail may be profiled to provide two parallel channels for the wheels of the container handling vehicle to run in.

FIG. 3 shows a prior art rail system featuring single-track rails 10, 11. When such a rail system is used, two container-handling vehicles are not allowed to pass each other at adjacent grid cells 14.

Where a single-track rail is used in one of the directions, then the boundary of the grid cell extends to the side of the track on the opposite side of the grid opening to the one being worked (neighboring grid cells will overlap by this track width in a similar way).

The rail system shown in FIGS. 4B and 4C, features horizontal double-track rails. Consequently, each rail is capable of accommodating two wheels in parallel. In such a rail system, the borders between neighboring grid cells 14 run along the centre-line of the horizontal rails, as is indicated in FIG. 4B.

In FIG. 4C, grid cell 14, in the middle of the section of the illustrated grid system, comprises a grid opening/grid cell opening 15. To the left (West) of grid cell 14, there is an adjacent grid cell 14W comprising a grid opening 15W. Likewise, to the right (East) of grid cell 14, there is an adjacent grid cell 14E comprising a grid opening 15E. Also, below grid cell 14 (South), there is an adjacent grid cell 14S comprising a grid opening 15S, and above grid cell 14 (North), there is an adjacent grid cell 14N comprising a grid opening 15N.

In FIG. 4C, a footprint 30 of a prior art container handling vehicle is schematically illustrated. In this embodiment the footprint 30 is defined by the horizontal extent of the wheels of the vehicle. As is evident from the figure, the footprint 30 has a horizontal extent which is less than the horizontal extent of a grid cell.

FIG. 5A is a perspective side view of parts of a lifting device 18 which can be mounted in a container handling vehicle and a container 6 to be lifted by the lifting device. The lifting device comprises a lifting frame 17, which is commonly connected to at least one rotatable lifting shaft via lifting bands, the lifting shaft arranged at an upper level within a cavity of the container handling vehicle.

FIG. 5B shows the footprint, i.e. the dashed area in the Figure denoted FV, of an exemplary container handling vehicle 9' according to the invention. The footprint FV is equal to the lateral extent of the container handling vehicle 9' in both directions. The container handling vehicle 9' consists of a first section 204 and a second section 205.

FIG. 5C shows the footprint of the first section 204, i.e. the dashed area in the Figure denoted F1. In the disclosed embodiment, the first section comprises a cavity for accommodating a storage bin 6 and a lifting device 18 as shown in FIG. 5A.

FIG. 5D shows the footprint of the second section 205, i.e. the dashed area in the Figure denoted F2.

Figure 6B:
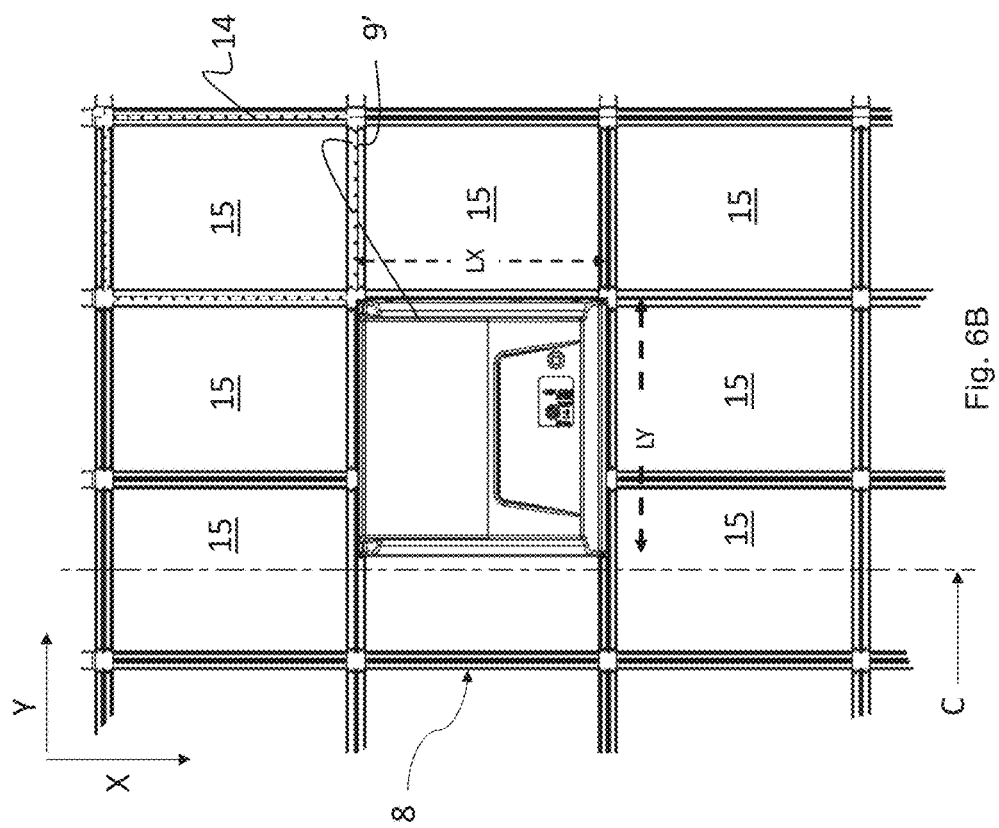
FIG. 6B is a top view of the container handling vehicle of FIG. 6A and illustrates the extent in the X- and Y-directions of the container handling vehicle on a rail system.
Figure 6A:
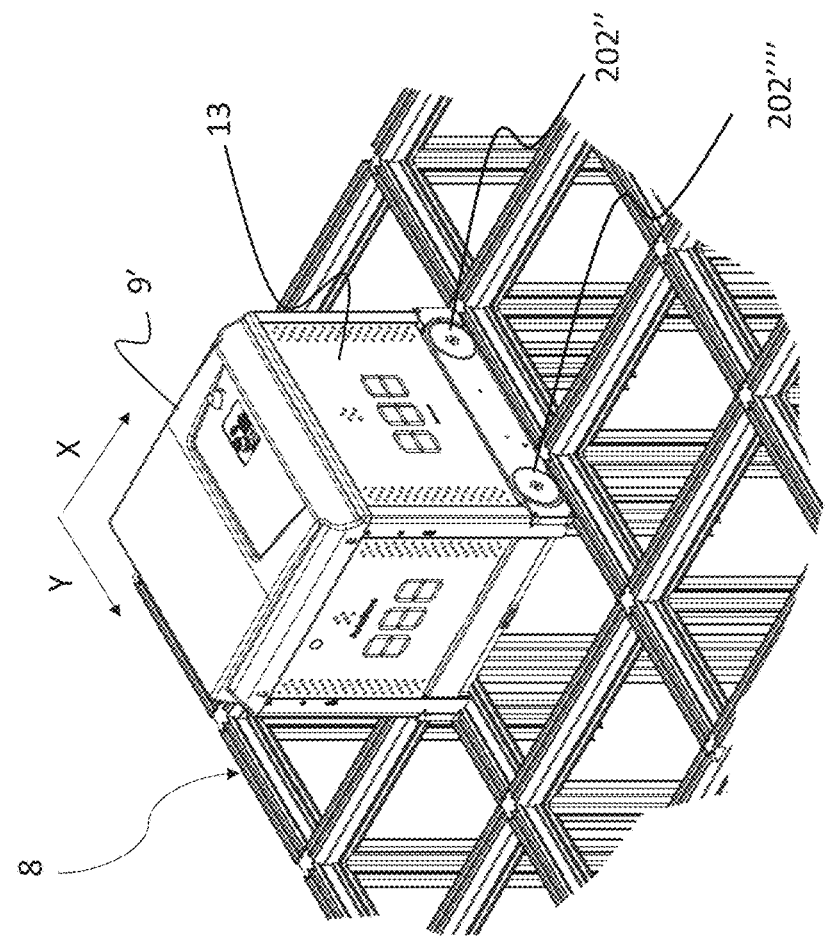
FIG. 6A is an angled side view from above of a container handling vehicle.

FIG. 6A is a perspective side view from above of a container handling vehicle 9'. The container handling vehicle 9' operates on a rail system 8, and is configured to move laterally in the X and Y directions indicated in the Figure. The X direction is perpendicular to the Y direction.

The vehicle 9' comprises a first set of wheels (not shown, see FIG. 8A) arranged at opposite portions of a vehicle body 13, for moving the vehicle 9' along a first direction X on a rail system 8 of a storage system 1, and a second set of wheels (only two of the wheels of the second set of wheels are shown, 202",202"") arranged at opposite portions of the vehicle body 13, for moving the vehicle 9' along a second direction Y on the rail system 8. The second direction Y is perpendicular to the first direction X. The first set of wheels is displaceable in a vertical direction Z between a first position and a second position. In the first position, the first set of wheels allow movement of the vehicle 9' along the first direction X, and in the second position, the second set of wheels allow movement of the vehicle 9' along the second direction Y. Structural details of suitable assemblies for providing displaceable sets of wheels are disclosed in for instance WO2015/193278 A1 and WO2017/153583, the contents of which are incorporated by reference.

FIG. 6B is a top view of a container handling vehicle 9' of FIG. 6A and illustrates the extent in the X- and Y directions (LX and LY) of the container handling vehicle 9' on a rail system 8. The line C indicates a center line of the grid cell 14 and grid cell opening 15 in the Y direction. The footprint of the container handling vehicle 9' in the X direction (LX) is substantially equal to the dimension of the grid cell 14 in the X direction and the footprint of the container handling vehicle 9' in the Y direction (line LY) is larger than the dimension of the grid cell 14 in the Y direction such that part of the vehicle body extends into a neighboring cell (in the embodiment shown, this is a neighbouring cell to the left of the cell being worked). This extension of the vehicle body into the neighboring cell is of a size less than half the lateral extent in the Y direction of the grid cell opening in the neighboring cell, meaning that the length LY is more than 1.0 grid cell but less than 1.5 grid cells 14 in the Y direction (1.0<LY<1.5 grid cells).

When operating on a rail system 8 as shown in FIG. 6B with rectangular grid cells 14, the footprint of the container handling vehicle 9' is substantially square because the extent of the grid cell 14 is longer in the X direction than in the Y direction and the container handling vehicle occupies more than one grid cell 14 in the Y direction and only one grid cell 14 in the X direction. A substantially square footprint has the advantage that the overall stability of vehicle 9' is improved compared to prior art solutions displaying a more rectangular footprint often in combination with a relatively high center of gravity.

Figure 7:
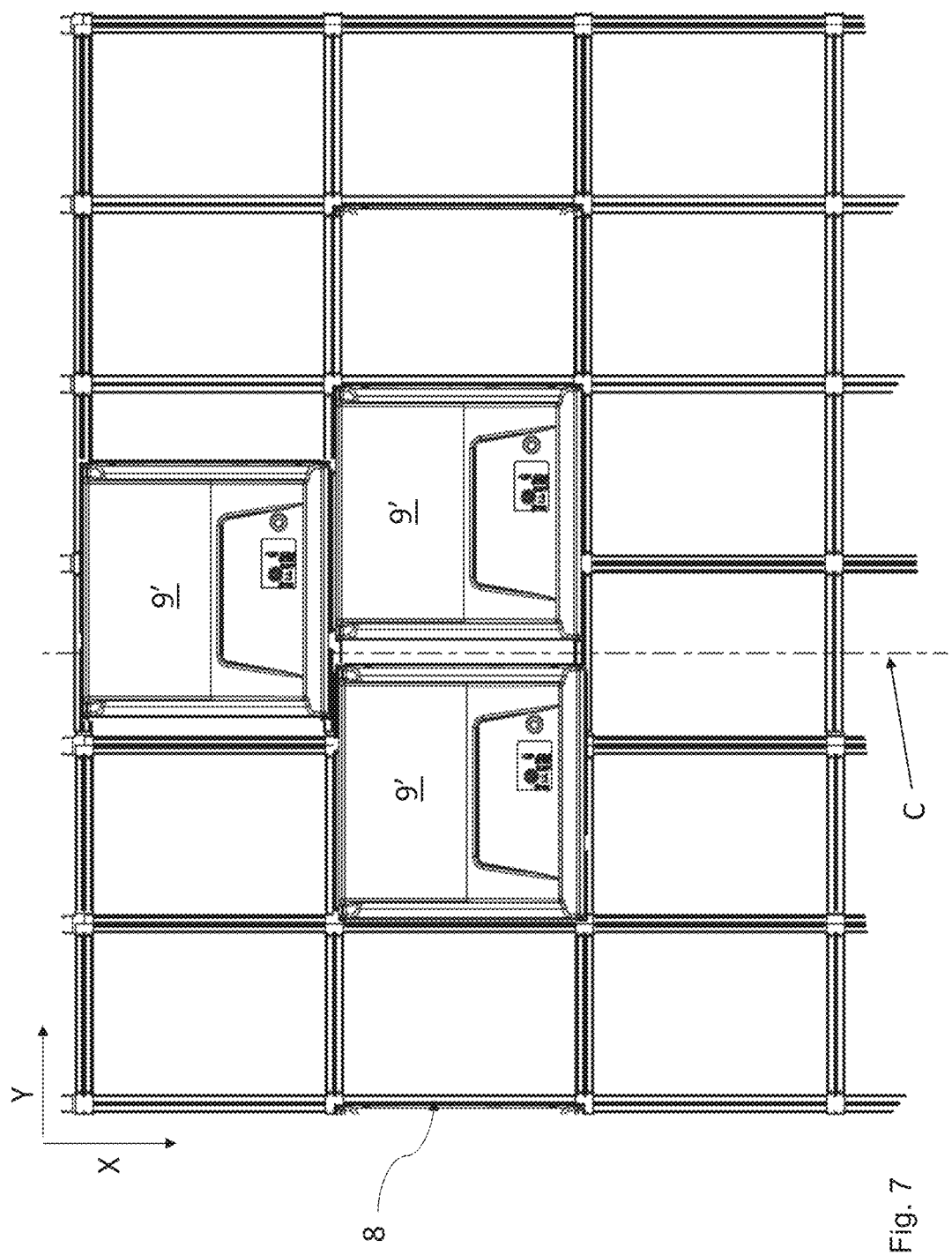
FIG. 7 is a top view of three such container handling vehicles passing each other and operating on a rail system.

FIG. 7 is a top view of three similar container handling vehicles 9' oriented in the same direction, passing each other and operating on a rail system 8 featuring dual-track rails as discussed above. As shown in the Figure, the container handling vehicles 9' have a footprint corresponding to the dimension of the grid cell 14 in the X direction allowing other container handling vehicles 9' travelling in the Y direction, to pass in neighboring cells (the container handling vehicles 9' occupying two rows of the rail system 8 as they pass by each other) on both sides of the vehicle 9'. However, because the size of the overlap into the neighboring cell is less than half the lateral extent of the grid cell in the Y direction, similar container handling vehicles 9' travelling in the X direction can pass each other occupying three rows.

Figure 8:
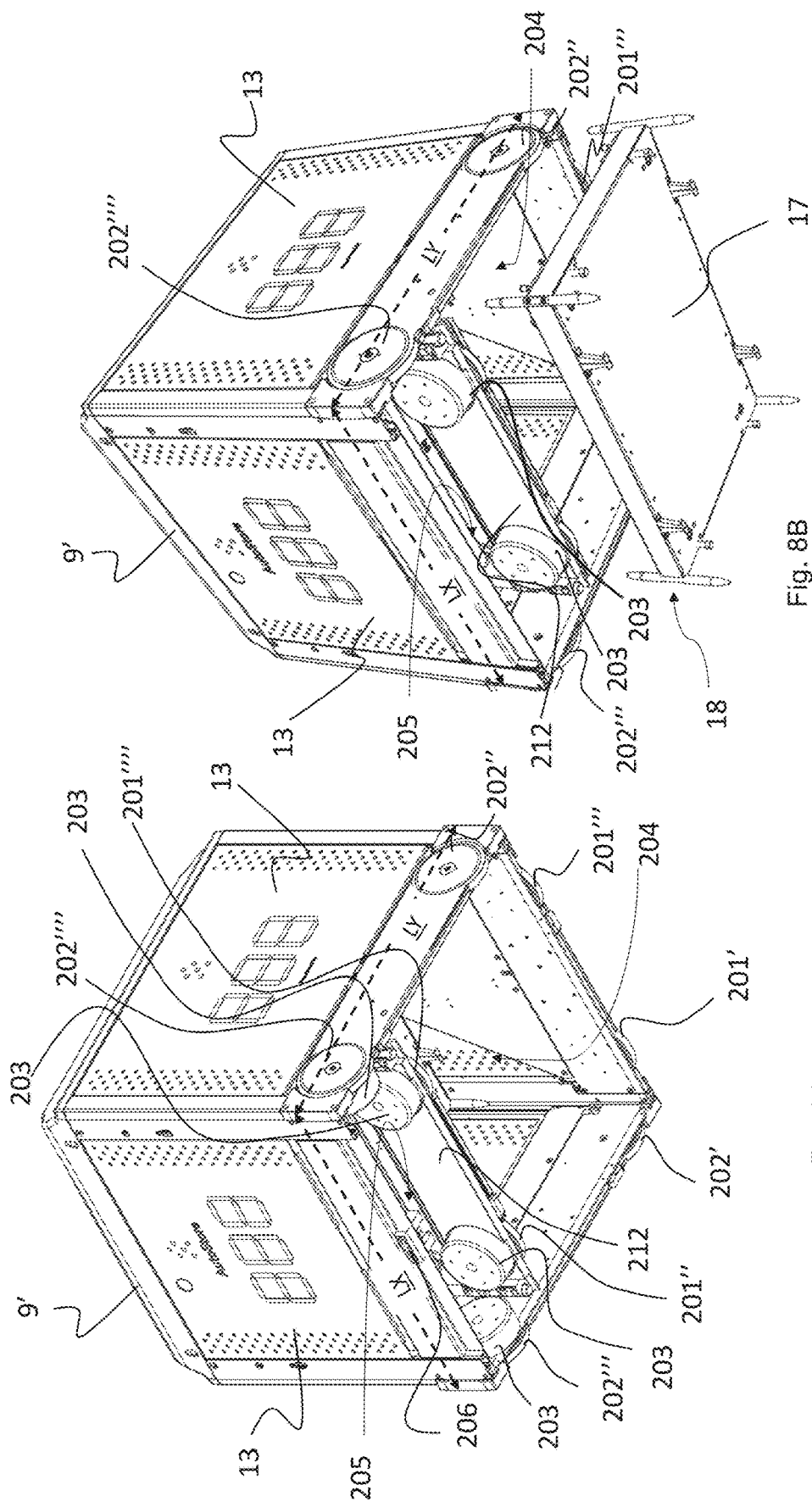
FIG. 8A is a perspective view from below of an interior of the container handling vehicle with the lifting device in an upper position inside a first section.
FIG. 8B is a perspective view from below of an interior of the container handling vehicle with some details omitted and the lifting device in a lower position having been lowered from a first section.

The presence of the second section 205, makes it possible to utilize larger and stronger motors 203, see FIG. 8A, for driving the wheels than in the prior art single cell robot shown in FIG. 2A, while at the same time keeping many of the advantages of such a robot.

As disclosed in FIG. 8A, the first section 204 accommodates a first 201', second 201", third 201''' and fourth 201'''' wheel of the first set of wheels and a first 202' and second 202" wheel of the second set of wheels, and the second section accommodates a third 202''' and fourth 202'''' wheel of the second set of wheels. This particular wheel arrangement is highly advantageous as it allows for the use of more powerful wheel hub motors 203 for driving the second 201" and the fourth 201'''' wheel of the first set of wheels as well as the third 202''' fourth 202'''' wheel of the second set of wheels.

Alternatively, the second 201" and fourth 201'''' wheel of the first set of wheels can be accommodated in the second section (not shown) provided the hub motors of said wheels are also arranged in the second section. To improve stability of the vehicle 9', the rim of the wheels 201', 201''' 202', 202", 202''' 202'''' are preferably arranged at the corners of the vehicle 9'.

Figure 9:
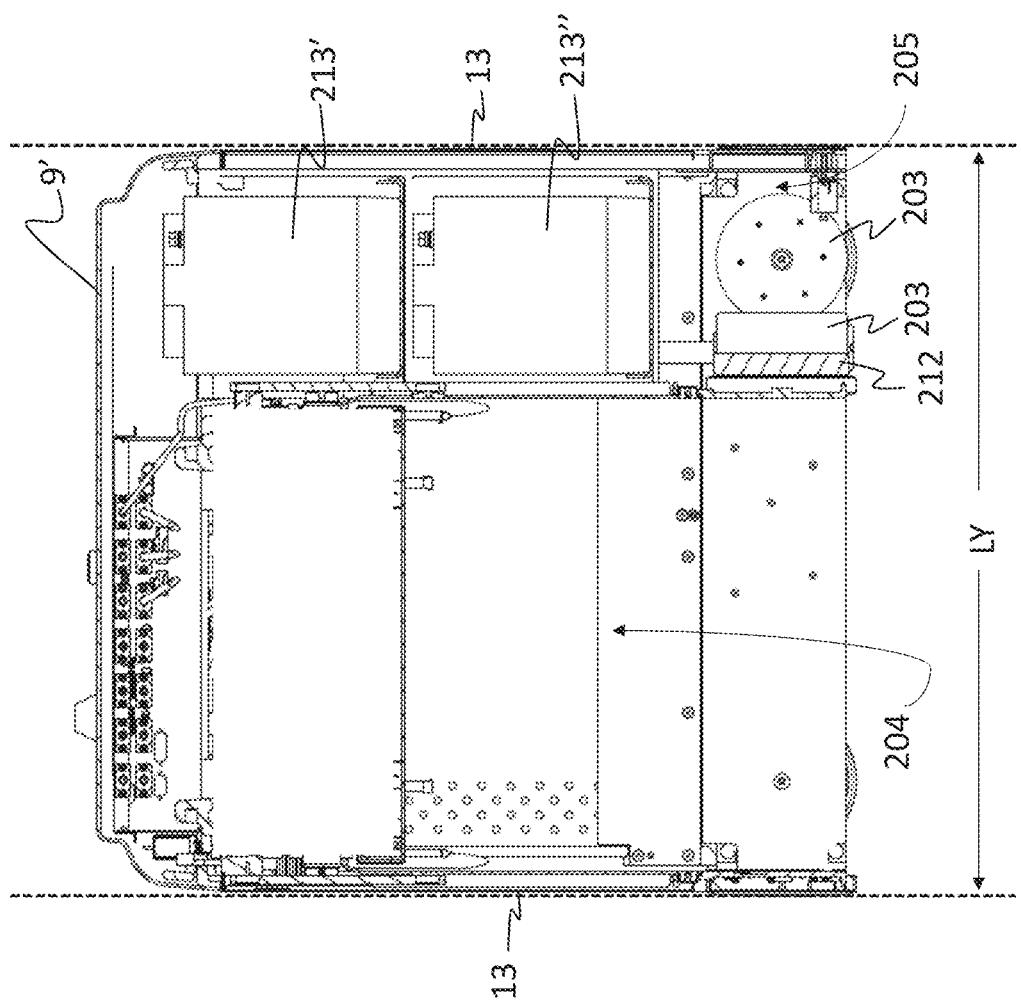
FIG. 9 is a side view of the container handling vehicle of FIG. 8A with two batteries visible in a second section.

All of the wheels 201', 201", 201''' 201'''' 202', 202", 202''' 202'''' are preferably arranged inside the lateral extent LX, LY in the X and Y directions of the vehicle body 13 (see also description in relation to FIG. 9).

The first section 204 and the second section 205 may be fully separated by a physical barrier at the intersection between the first and second sections 204, 205, such as a wall or plate or similar. Alternatively, the first and second sections 204, 205 may be partly separated at the intersection between the first and second section 204, 205, for example by providing a barrier over parts of the intersection.

In FIG. 8A, the first and second section is separated by a wheel connecting element 212 (i.e. a connection plate or beam) to which the second 201" and the fourth 201"" wheel of the first set of wheels and their respective hub motors 203 are connected . . . . The wheel connecting element 212 is part of a wheel displacement assembly 214, such that the second 201" and the fourth 201"" wheel of the first set of wheels (together with the first 201' and the third 201'" wheel of the first set of wheels) may be moved in a vertical direction.

In the disclosed embodiment, the second 201" and the fourth 201"" wheels are accommodated in the first section 204, while the hub motors 203 extend into the second section. In an alternative embodiment, both the second 201" and the fourth 201"" wheels, as well as the hub motors, may be accommodated in the second section 205.

It is noted that having the second 201" and the fourth 201"" wheel of the first set of wheels, as well as the third 202'" fourth 202"" wheel of the second set of wheels, arranged such that their hub motors 203 extend/protrude into the second section 205 allows for the use of more powerful motors than would be the case if the hub motors were arranged such that they would extend into the first section 204. The remaining wheels, i.e. the wheels not featuring a hub motor extending into the second section, may either be passive or motorized, for instance motorized by in-wheel hub motors as disclosed in WO 2016/120075 A1.

FIG. 8B is a perspective view from below of an interior of the container handling vehicle 9' showing the lifting frame 17 of the lifting device 18 in a lower position extending downwardly from the first section 204. The lifting device 18 may have similar features as the lifting device described in relation to FIGS. 2A and 2B.

FIG. 9 is a side view of a container handling vehicle with hub motors 203 and two batteries 213', 213" arranged in the second section 205. As is clear from e.g. FIG. 9, the exterior facing side of the wheels may in one aspect be arranged such that they are not extending outside the vehicle body 13 (indicated by the dotted lines on each side of the vehicle 9' in FIG. 9). For example, the exterior facing sides of the wheels in the lateral X and Y directions may be flush with the vehicle body 13. Although not shown in FIG. 9 (but in FIGS. 8A and 8B+6B), the same applies to the wheels in the opposite direction (X), i.e. those wheels may also be arranged such that they are not extending outside the vehicle body 13.

The vehicle body 13 includes any of the following elements, even if all are present or if some are missing, such as body frame, side cover panels or plates, wheel suspensions, housing for track sensors between the wheels etc. A rotating exterior surface of the wheels may thus be arranged in the same vertical plane as one of the walls in the vehicle body 13. Alternatively, the wheels may be arranged inside the vehicle body 13 such that the rotating exterior surfaces of the wheels can be laterally displaced relative a vertical plane formed by one of the walls in the vehicle body 13. In FIG. 6B, none of the wheels are visible in the top view, indicating that the outermost lateral parts of all wheels are arranged such that they are not extending outside the vehicle body 13.

The container handling vehicle 9' may be provided with an interface 206 (see FIG. 8A) for charging of the batteries 213', 213" in the container handling vehicle 9'.

FIG. 10A is a side view of a container handling vehicle 9' where certain parts like the covers are removed. The container handling vehicle 9' has an exchangeable battery 208 arranged inside a battery receiving unit 209 in an upper portion of the container handling vehicle. It is further disclosed a controller unit 210 which communicates with the overall control system. The controller unit 210 may further accommodate a capacitor power supply (not shown). The capacitor power supply typically has the ability to store enough power to operate any of the electrically driven components of the vehicle 9' if the main power supply malfunctions or is lost. Such situations may e.g. be when the battery 208 is to be exchanged. The battery exchange is typically taking place on two different locations, i.e. the battery to be replaced (the "empty" battery) is dropped off at a different location to where the replacement battery is picked up from ("fully charged" battery), therefore the capacitor power supply may be used to move the robot between the two different locations. Alternatively, if the main battery malfunctions, the capacitor power supply can be used to operate the lifting device and/or move the robot to a service area. Furthermore, any regenerated power can be supplied to the capacitor power supply in order to make sure that the capacitor power supply has sufficient power capacity to perform any of its desired functions.

FIG. 10B is another view of FIG. 10A, where it is disclosed an assembly of motors comprising a lifting device motor 211 arranged in the second section 205. The lifting device motor 211 is connected at one end of a rotatable lifting shaft (not shown) of a lifting device arranged in the first section. This lifting device motor 211 may replace other lifting device motor(s) (not shown) arranged in the first section or function as an auxiliary motor in addition to any lifting device motors arranged in the first section. Thus, the second section 205 makes it possible to reduce the number of lifting device motor(s) in the first section to a minimum (even avoid the use of a lifting device motor in the first section) because the size and lifting capacity of the lifting device motor 211 arranged in the second section 205 is not limited by the available space of the first section. In other words, the lifting device motor 211 in the second section may be the sole lifting device motor of the vehicle, such that the available space in a top section of the first section of the vehicle 9' is increased, or the motor 211 may be an auxiliary motor providing an increased lifting capacity to the lifting device.

Figure 10E:
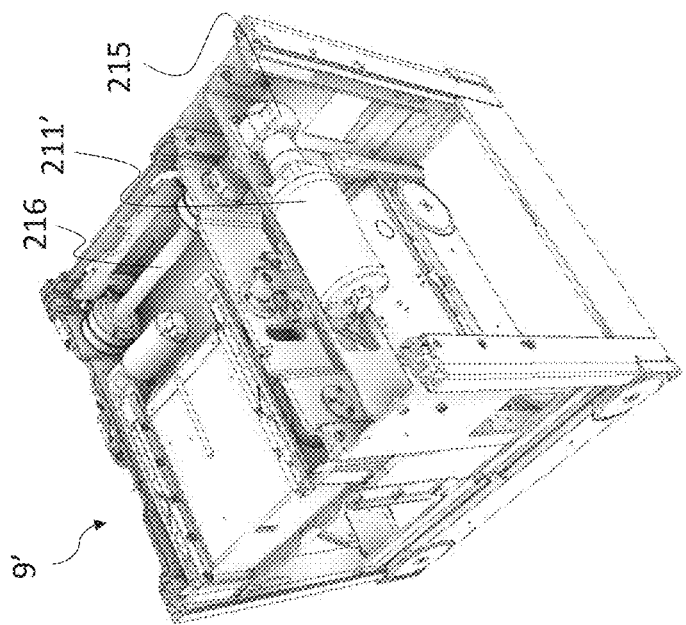
FIGS. 10D and 10E are different views of an alternative container handling vehicle of FIG. 10C, where the lifting device motor and angle gear are rotated 90 degrees relative the lifting device motor and angled transmission of FIG. 10C.
Figure 10D:
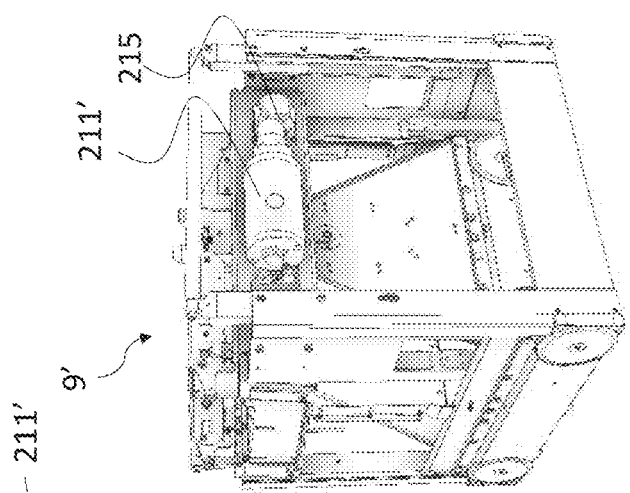
Figure 10C:
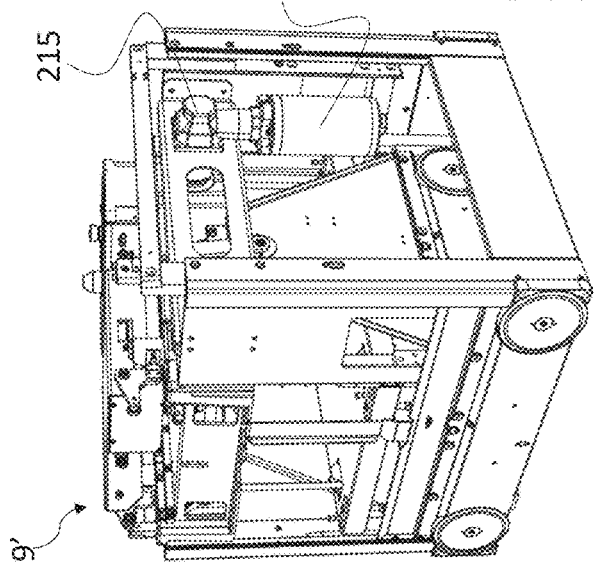
FIG. 10C is perspective view of an alternative container handling vehicle of FIG. 10B, where a lifting device motor and angled transmission (angled gear) can be seen in the second section.

FIG. 10C shows an embodiment of a container handling vehicle 9', wherein the lifting device comprises a single lifting device motor 211' and angled transmission 215 are arranged in the second section. The embodiment serves to illustrate how the available space of the second section allows for the use of a more powerful (and consequently larger) lifting device motor 211' than what would be possible to arrange in the first section alone. This allows for the use of storage containers having a higher total weight (i.e. the weight including products stored in the container). It is noted that the prior art vehicle in FIGS. 2B and 2C would likely have available space for a similar large lifting device motor, but would not be able to fully utilize the possibility of increased lifting capacity due to the cantilever design.

Again referring to FIG. 10C, the angled transmission 215 with connected lifting device motor 211' is angled downwards (i.e. in a mainly vertical direction).

In contrast, as seen in FIGS. 10D and 10E, a similar embodiment as in FIG. 10C is shown, however, the angled transmission 215 with connected lifting device motor 211' is angled sideways (i.e. in a mainly horizontal direction), rotated 90 degrees relative to the embodiment in FIG. 10C. Furthermore, FIG. 10E shows the lifting device axle 216 to which axle lifting bands connected to the lifting device 18

(not shown in FIG. 10E) are connected and coils up and reels out during lifting and lowering of the lifting device.

Figure 10H:
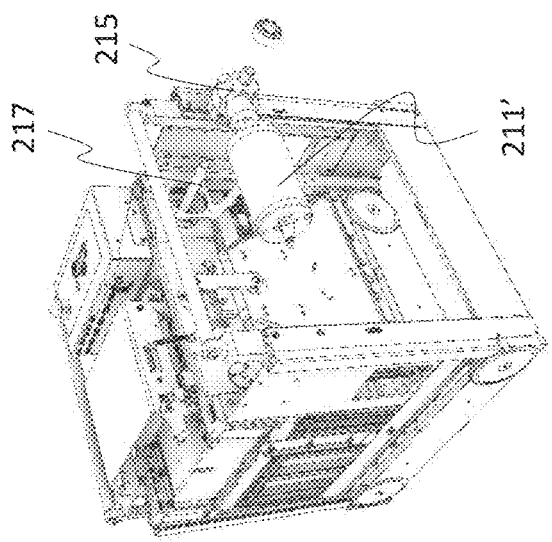
FIG. 10H is an exploded view of a hollow shaft gear used to connect the lifting device motor and the lifting axle.
Figure 10G:
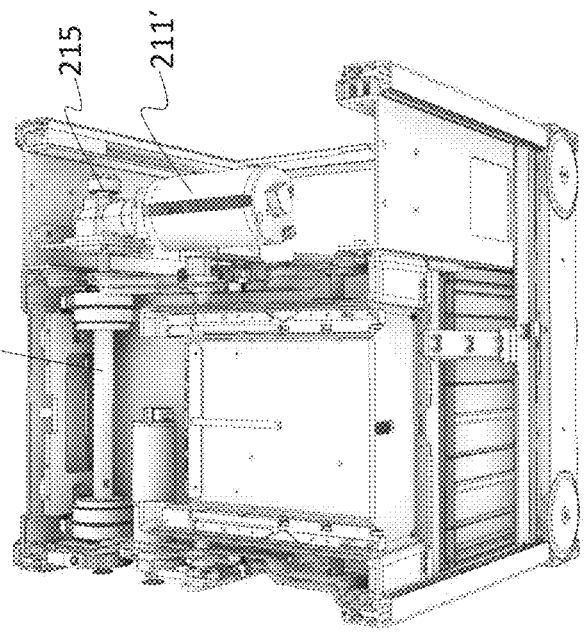
FIGS. 10F and 10G are perspective views of an alternative container handling vehicle of FIG. 10B, where a lifting device motor and hollow shaft gear can be seen in the second section.
Figure 10F:
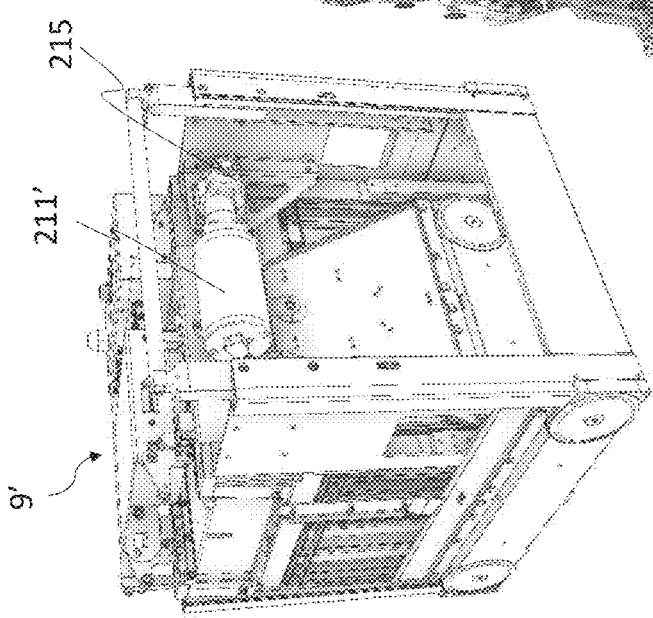

FIGS. 10F and 10G are perspective views of an alternative container handling vehicle of FIG. 10B, where the lifting device motor 211' and a hollow shaft gear 215 are arranged in the second section.

The configuration of the lifting device motor 211' in FIGS. 10B and 10C renders possible the use of two lifting device motors 211, 211' connected to respective lifting axles 216 (only one lifting axle shown in the Figures). Such a setup, i.e. two lifting device motors 211, 211' arranged at opposite sides in the second section can provide a more stable container handling vehicle 9' as the weight distribution from the lifting device motors 211, 211' will be more advantageous in terms of the overall centre of gravity for the container handling vehicle 9'.

FIG. 10H is an exploded view of a hollow shaft gear 215 used to connect the lifting device motor 211' and lifting device axle 216. Compared to the embodiment of FIGS. 10C-10E, the lifting axle 217 of FIGS. 10F-10H has been extended and the gear 215 is connected directly to the extended lifting axle 217 without a dedicated connection. To be able to make this direct connection, a hollow shaft gear 215 is used instead of an angled transmission. The hollow shaft gear 215 can be secured to the extended lifting axle 217 using dedicated means, such as e.g. as shown in the Figure where a clamp and wedge configuration is used.

FIGS. 10I-K are alternative views of a hollow shaft gear 215 in a container handling vehicle 9' used to connect the lifting device motor 211' and the lifting axle where the second section 205 is relatively smaller, i.e. less deep, than the second section 205 in e.g. FIGS. 10F-H, and where:

FIG. 10I is a perspective side view of the container handling vehicle 9' and lifting device motor 211', FIG. 10J is a perspective side view from slightly above of the container handling vehicle 9' and lifting device motor 211', FIG. 10K is a side view into the second section in an Y direction of the container handling vehicle 9'.

As indicated above, in all FIGS. 10I-10K, the first section 204 is of the same size as the first section 204 of the container handling vehicle 9' in e.g. FIGS. 10F-10H and the second section 205 is smaller, i.e. it is less deep and has a relatively smaller extent in the Y direction, than the second section 205 of the container handling vehicle 9' in FIGS. 10F-10H. The setup and relatively small size (i.e. small extent in the Y direction) of the second section 205 in FIGS. 10I-10K has an advantage in that the cantilever or overhang formed of the second section 205 when the container handling vehicle is running in the X direction has minimum impact on the stability of the container handling vehicle 9' when travelling in the X direction. Further advantages in relation to overall stability of the container handling vehicle 9' is achieved by a more optimum weight distribution of the lifting device motor 211' when orienting the lifting device motor 211' sideways (i.e. horizontal).

The radial and longitudinal extent of the lifting device motor 211' is adapted to fit into the available space in the X direction and Y direction (and height in Z-direction) of the second section 205. As shown in FIGS. 10I-10K, the longitudinal extent of the sideways (horizontal) arranged lifting device motor 211' can be quite limited compared to the extent of the second section in the X direction while the radial extent of the lifting device motor 211' is more or less similar to the extent of the second section 205 in the Y direction.

Figure 11B:
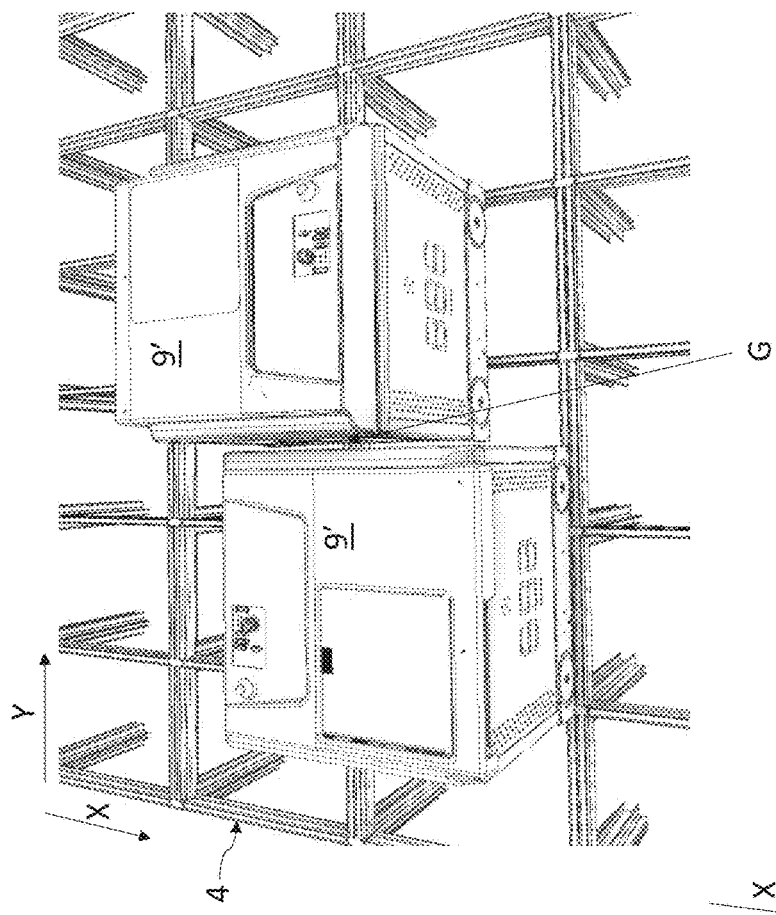
FIG. 11B is a top perspective view of FIG. 11A.
Figure 11A:
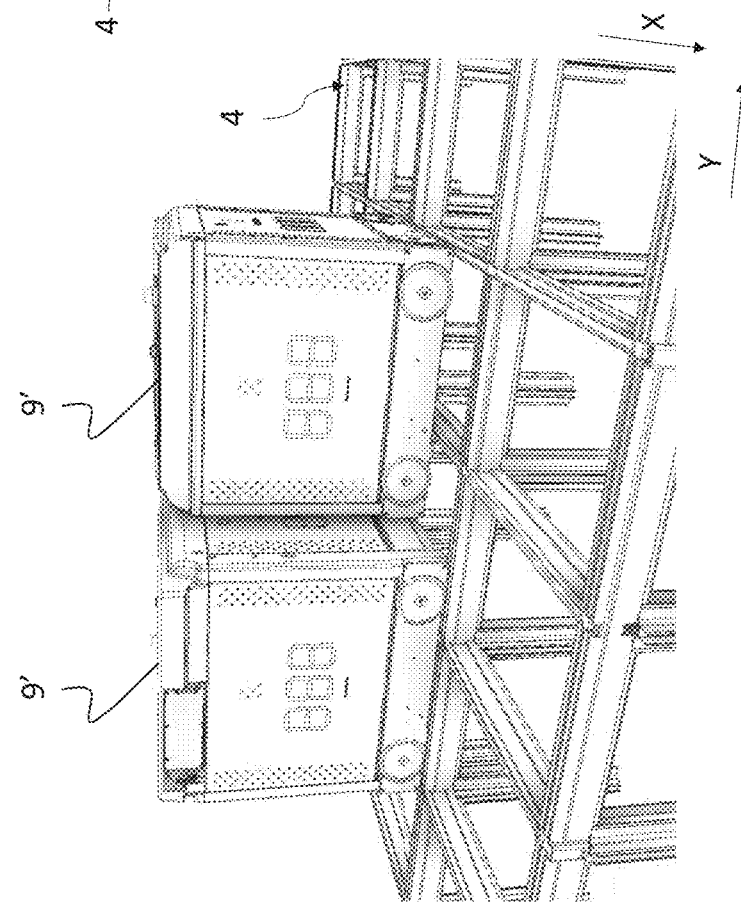
FIG. 11A is a side perspective view of two container handling vehicles passing each other in the X direction of a rail system.

FIG. 11A is a side view of two container handling vehicles 9' travelling in the X direction of the rail system 8 passing each other using a total of three cells in the Y direction of the rail system 8. This particular rail system comprises single track rails in the X direction and double-track rails in the Y direction. The combination of single- and double-track rails may in some instances be the most cost-efficient solution, even if a rail system using only double-track rails is optimal regarding the possible travel paths of the container-handling vehicles arranged thereon.

FIG. 11B is a top view of FIG. 11A showing a gap G between the vehicle bodies 13 in the Y direction rendering possible the two vehicles 9' travelling in the X direction to occupy only three rows in the Y direction.

FIGS. 12A-C show differences in the center of gravity of the storage containers inside the storage container cavity relative the center of the footprint of the vehicle body, where FIG. 12A illustrates a prior art single cell robot, FIG. 12B is a prior art central cavity robot, and FIG. 12C shows an exemplary container handling vehicle according to the present invention.

In a single cell and central cavity robot, FIG. 12A, the center of gravity of the storage container CGSC is in the center of the cavity which also coincides with the center of the footprint of the vehicle body CGV.

In in a central cavity robot, FIG. 12B, the center of gravity of storage container CGSC is in the center of the cavity which also coincides with the center of the footprint of the vehicle body CGV.

FIG. 12C shows an exemplary container handling vehicle according to the present invention, where the center of gravity of storage container CGSC is displaced relative the center of the footprint of the vehicle body CGV.

FIGS. 13A-C are plan views showing differences in imaginary lines extending between wheel pairs of the same sets of wheels, and how said lines intersect, or not, imaginary lines between other wheels. FIG. 13A illustrates a prior art single cell robot, FIG. 13B is a prior art central cavity robot, and FIG. 13C shows an exemplary container handling vehicle according to the present invention.

In FIG. 13A, in a single cell and central cavity robot, each imaginary line L1, L2, L3, L4 extending between each of two pairs of opposed wheels in each set of wheels intersects two other imaginary lines L1, L2, L3, L4.

In FIG. 13B, in a central cavity robot, none of the imaginary lines L1, L2, L3, L4 extending between each of two pairs of opposed wheels in each set of wheels intersects another imaginary line L1, L2, L3, L4.

FIG. 13C shows an exemplary container handling vehicle according to the present invention where imaginary lines L1, L2 between each of two pairs of opposed wheels in the first set of wheels intersect one imaginary line L3 extending between two wheels in the second set of wheels, and where one imaginary line L4 between two wheels in the second set of wheels does not intersect any imaginary lines.

FIG. 13D shows a possible setup of centres of wheel bases for the first set of wheels and the second set of wheels, respectively, and that said wheel bases are off-centre relative each other. The wheel base of the first set of wheels 22 (comprising two wheel pairs where a first wheel pair comprises wheels denoted 201', 201" and a second wheel pair comprises wheels 201''' and 201'''') has a centre CWB1 and the wheel base of the second set of wheels 23 (comprising two wheel pairs where a first wheel pair comprises opposite wheels denoted 202', 202" and a second wheel pair comprises opposite wheels 202' and 202') has a centre CWB2. The wheels 201'-201'''' in the first set of wheels 22 are arranged on opposite sides of the first section 204 and the wheels 202'-202'''' in the second set of wheels 23 are arranged on opposite sides of the vehicle body 13. The centre CWB2 of the second set of wheels 23 coincides with the centre of the vehicle body 13.

The first set of wheels 22 comprises four wheels 201', 201'',201''',201'''' in total. The four wheels 201',201''',201', 201'' in the first set of wheels 22 are arranged as two pairs of wheel for movement in the X direction, where the wheels 201',201''; 201''',201'''' of each pair are arranged on opposite sides of the first section 204.

The second set of wheels 23 comprises four wheels 202',202'',202''',202'''' in total. The four wheels 202',202'', 202''',202'''' are arranged as two pairs of wheels in the Y direction, where the wheels 202',202'';202''',202'''' of each pair are arranged on opposite sides of the vehicle body 13 (which may also be on opposite sides of the first section).

The invention has been described with reference to the Figures, however the skilled person will understand that there may be made alterations or modifications to the described embodiments without departing from the scope of the invention as described in the attached claims.

| Reference numerals |
| --- |
| (1) underlying storage system/frame structure |
| (3) horizontal member |
| (4) three-dimensional grid, storage grid |
| (5) storage column |
| (6, 6') storage container/storage bin |
| (7) stacks |
| (8) rail system |
| (9, 9') container handling vehicle, vehicle |
| (10) first set of rails or tracks |
| (11) second set of rails or tracks |
| (10, 10b) track in X direction |
| (11a, 11b) track in Y direction |
| (12) grid column |
| (13) vehicle body |
| (14) grid cell |
| (14E) adjacent grid cell |
| (14N) adjacent grid cell |
| (14S) adjacent grid cell |
| (14W) adjacent grid cell |
| (15) grid opening/grid cell opening |
| (15E) grid opening |
| (15N) grid opening |
| (15S) grid opening |
| (15W) grid opening |
| (17) lifting frame |
| (18) lifting device |
| (19) first port column |
| (19) drop-off port |
| (20) second port |
| (20) pick-up port |
| (21) cavity |
| (22) first set of wheels |
| (23) second set of wheels |
| (30) footprint prior art container handling vehicle |
| (201') first wheel first set of wheels |
| (201'') second wheel first set of wheels |
| (201''') third wheel first set of wheels |
| (201'''') fourth wheel first set of wheels |
| (202') first wheel second set of wheels |
| (202'') second wheel second set of wheels |
| (202''') third wheel second set of wheels |
| (202'''') fourth wheel second set of wheels |
| (203) first motor |
| (203) second motor |
| (203) assembly of motors |
| (204) first section |
| (205) second section |
| (206) interface |
| (208) battery |
| (209) battery receiving unit |

-continued

| Reference numerals |
| --- |
| (210) controller unit |
| (211') lifting device motor |
| (212) wheel connecting element |
| (213', 213'') batteries |
| (214) wheel displacement assembly |
| (215) Hollow shaft gear/angled transmission |
| (216) Lifting device axle |
| (217) Extended lifting axle |
| (P) horizontal plane |
| (X) X direction/first direction |
| (Y) Y direction/second direction |
| (Z) vertical direction |
| (FV) footprint of container handling vehicle |
| (F1) footprint first section |
| (F2) footprint second section |
| (L1) imaginary line |
| (L2) imaginary line |
| (L3) imaginary line |
| (L3) imaginary line |
| (L4) imaginary line |
| (CGSC) center of gravity storage container |
| (CGV) center of footprint vehicle body |
| (LX) lateral extension, length X direction |
| (LY) lateral extension, length Y direction |
| (CWB1) centre wheel base first set of wheels |
| (CWB2) centre wheel base second set of wheels |

What is claimed is:

1. A container handling vehicle for lifting storage containers from a three-dimensional grid of an underlying storage system, comprising:
   a first set of wheels for moving the vehicle along a first direction on a rail system of the grid;
   a second set of wheels for moving the vehicle along a second direction on the rail system of the grid, the second direction being perpendicular to the first direction;
   a vehicle body, the vehicle body having a vehicle body footprint defined by horizontal peripheries in the first and second directions of the vehicle body, the vehicle body comprising a first section and a second section, the first section having a first footprint and the second section having a second footprint, the first and second footprints being defined by horizontal peripheries in the first and second directions of the first and second sections, respectively;
   a lifting device for lifting storage containers from the storage system; and
   a lifting device motor arranged to drive the lifting device when lifting storage containers from the storage system;
   wherein the first section and the second section are arranged side-by-side such that a total area of the first and second footprints equals a total area of the vehicle body footprint, and a centre point of the first footprint is arranged off centre relative a centre point of the vehicle body footprint;
   wherein the first section defines a storage container receiving space which is configured to accommodate a storage container, the first section also accommodating the lifting device for lifting a storage container from the storage system;
   wherein the lifting device motor is accommodated in the second section;
   wherein the lifting device comprises a lifting shaft which comprise a first end section and a second end section for connecting a first pair of lifting bands and a second pair of lifting bands;

wherein all lifting bands are connected to a lifting frame of the lifting device for lifting and lowering of the lifting device;
wherein the lifting bands have a first end and a second end connected to the lifting shaft and a corresponding lifting band connector on the lifting frame, respectively;
wherein each pair of lifting bands has a first lifting band connected at the first end section of the lifting shaft and a second lifting band connected at the second end section of the lifting shaft; and
wherein the first pair of lifting bands extends in a substantially horizontal direction from the lifting shaft towards a band guiding assembly, the band guiding assembly is arranged to change the direction of the first pair of lifting bands to extend in a vertical direction, and the second pair of lifting bands extends in a vertical direction from the lifting shaft.

2. The container handling vehicle according to claim 1, wherein a size ratio of the first footprint relative the second footprint is at least 2:1.

3. The container handling vehicle according to claim 1, wherein the first set of wheels is arranged on opposite sides of the first section and the second set of wheels is arranged on opposite sides of the vehicle body.

4. The container handling vehicle according to claim 1, further comprising a lifting axle, wherein the lifting device motor is a connected at one end of the lifting axle.

5. The container handling vehicle according to claim 4, further comprising an angled transmission arranged in the second section between the lifting axle and the lifting device motor.

6. The container handling vehicle according to claim 5, wherein the lifting device motor is arranged perpendicular to the lifting axle via the angled transmission.

7. The container handling vehicle according to claim 6, wherein the lifting device motor is angled sideways.

8. The container handling vehicle according to claim 6, wherein the lifting device motor is angled downwards.

9. The container handling vehicle according to claim 4, wherein an extension of a lifting axle extends into the second section and wherein a hollow shaft gear is connected directly to the extension of the lifting axle.

10. The container handling vehicle according to claim 9, wherein the hollow shaft gear and the lifting device motor are angled sideways.

11. An automated storage and retrieval system comprising:
a three-dimensional grid of a storage system comprising a rail system and a plurality of stacks of storage containers; and
at least one container handling vehicle for lifting the storage containers from the three-dimensional grid of an underlying storage system, comprising:
a first set of wheels for moving the vehicle along a first direction on the rail system of the grid;
a second set of wheels for moving the vehicle along a second direction on the rail system of the grid, the second direction being perpendicular to the first direction;
a vehicle body, the vehicle body having a vehicle body footprint defined by horizontal peripheries in the first and second directions of the vehicle body, the vehicle body comprising a first section and a second section, the first section having a first footprint and the second section having a second footprint, the first and second footprints being defined by horizontal peripheries in the first and second directions of the first and second sections, respectively;
a lifting device for lifting the storage containers from the storage system; and
a lifting device motor arranged to drive the lifting device when lifting the storage containers from the storage system;
wherein the first section and the second section are arranged side-by-side such that a total area of the first and second footprints equals a total area of the vehicle body footprint, and a centre point of the first footprint is arranged off centre relative a centre point of the vehicle body footprint;
wherein the first section defines a storage container receiving space which is configured to accommodate a storage container, the first section also accommodating the lifting device for lifting a storage container from the storage system;
wherein the lifting device motor is accommodated in the second section;
wherein the lifting device comprises a lifting shaft which comprise a first end section and a second end section for connecting a first pair of lifting bands and a second pair of lifting bands;
wherein all lifting bands are connected to a lifting frame of the lifting device for lifting and lowering of the lifting device;
wherein the lifting bands have a first end and a second end connected to the lifting shaft and a corresponding lifting band connector on the lifting frame, respectively;
wherein each pair of lifting bands has a first lifting band connected at the first end section of the lifting shaft and a second lifting band connected at the second end section of the lifting shaft; and
wherein the first pair of lifting bands extends in a substantially horizontal direction from the lifting shaft towards a band guiding assembly, the band guiding assembly is arranged to change the direction of the first pair of lifting bands to extend in a vertical direction, and the second pair of lifting bands extends in a vertical direction from the lifting shaft;
wherein the rail system comprises a first set of parallel tracks arranged in a horizontal plane and extending in the first direction, and a second set of parallel tracks arranged in the horizontal plane and extending in the second direction, wherein the first and second sets of tracks form a grid pattern in the horizontal plane comprising a plurality of adjacent grid cells, each grid cell comprising a grid opening defined by a pair of opposed tracks of the first set of tracks and a pair of opposed tracks of the second set of tracks;
wherein the plurality of stacks of storage containers are arranged in storage columns located beneath the rail system, wherein each storage column is located vertically below a grid opening; and
wherein the first footprint of the first section is substantially equal to a grid cell defined by a cross-sectional area, including width of the tracks, between a pair of opposed tracks of the first set of tracks and a pair of opposed tracks of the second set of tracks, and the second section extends partially into a neighboring grid opening when the first section is positioned over an adjacent grid opening.

12. The automated storage and retrieval system according to claim 11, wherein the footprint of the container handling vehicle in the first direction is equal to 1.0 grid cell in the first direction, and the footprint of the container handling vehicle in the second direction is more than 1.0 grid cell and less than 1.5 grid cells in the second direction, a grid cell being a cross-sectional area, including width of the tracks, between a midpoint of two rails running in the first direction and a midpoint of two rails running in the second direction.

* * * * *